(12) United States Patent
Le et al.

(10) Patent No.: US 11,179,290 B2
(45) Date of Patent: *Nov. 23, 2021

(54) MASSAGE CHAIR HAVING A WIRELESS CHARGER, ARMREST SLIDING, HAMMERING DEVICES, AND OXYGEN GENERATION

(71) Applicant: Luraco, Inc., Arlington, TX (US)

(72) Inventors: Kevin Le, Richland Hills, TX (US); Thanh Le, Arlington, TX (US); Varad Nitin Gokhale, Irving, TX (US)

(73) Assignee: Luraco, Inc., Arlington, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/439,218

(22) Filed: Jun. 12, 2019

(65) Prior Publication Data
US 2019/0290533 A1 Sep. 26, 2019

Related U.S. Application Data

(63) Continuation of application No. 16/283,186, filed on Feb. 22, 2019, now abandoned, which is a
(Continued)

(51) Int. Cl.
*A61H 9/00* (2006.01)
*H02J 50/12* (2016.01)
*A47C 1/00* (2006.01)

(52) U.S. Cl.
CPC ............. *A61H 9/0071* (2013.01); *A47C 1/00* (2013.01); *A61H 9/0078* (2013.01); *H02J 50/12* (2016.02);
(Continued)

(58) Field of Classification Search
CPC ...... A61H 9/0078; A61H 9/005; A61H 9/007; A61H 9/0071; A61H 2201/0149;
(Continued)

(56) References Cited

U.S. PATENT DOCUMENTS 2,480,552 A * 8/1949 Colvez .................. A47C 1/028
297/93
2,751,971 A * 6/1956 Gentsch ................ A47C 7/546
297/411.27
(Continued)

FOREIGN PATENT DOCUMENTS

CN 1446529 A 12/2002
CN 100398081 C 7/2008
(Continued)

OTHER PUBLICATIONS

"MassageChairStore.com," downloaded Sep. 12, 2013, <URL:http://www.massagechairstore.com/>.
(Continued)

*Primary Examiner* — Samchuan C Yao
*Assistant Examiner* — Nathan M Le
(74) *Attorney, Agent, or Firm* — Hoang Steve Ngo

(57) ABSTRACT

The disclosure is directed to a massage chair having a massage chair frame, a massage system, and a noise-reducing, enclosure device. The massage chair frame includes a first end, a second end, a seat body area portion, and a back body area portion. The massage system includes at least one air massage element, an air pump, and at least one air valve device for regulating air flow into and out of the at least one air massage element. The noise-reducing, enclosure device includes an enclosure housing and noise-reducing material positioned inside the enclosure housing. The enclosure housing encloses the air pump and the plurality of air valve devices during operation during operation such that noise generated from or made by the air pump and the plurality of air valve devices during operation is reduced, contained or eliminated. Additionally, the disclosure provides additional features for improving user experience including hammering devices, heating acupuncture devices, oxygen generation, voice recognition control, a remote control pouch, and
(Continued)

a wireless device pouch having wireless charging functionality.

35 Claims, 22 Drawing Sheets

Related U.S. Application Data continuation-in-part of application No. 15/593,320, filed on May 11, 2017, now Pat. No. 10,724,549.

(52) U.S. Cl.
CPC ............... *A61H 2201/0149* (2013.01); *A61H 2201/5048* (2013.01)

(58) Field of Classification Search
CPC ........ A61M 16/101; A47C 1/03; A47C 7/546; A47C 1/00; A47C 1/02; A47C 7/54; A47C 7/541; A47C 7/543
USPC .................... 601/84, 86, 89, 90, 91, 97, 107
See application file for complete search history.

(56) References Cited

U.S. PATENT DOCUMENTS

| | | | |
|---|---|---|---|
| 2,891,538 A * | 6/1959 | Moxley | A61H 23/0254 601/56 |
| 3,483,862 A | 12/1969 | Takeuchi | |
| 3,532,089 A | 10/1970 | Arntzenius | |
| 4,231,355 A * | 11/1980 | Hara | A61H 9/0078 601/18 |
| 4,422,448 A | 12/1983 | Sugai et al. | |
| 4,422,449 A | 12/1983 | Hamabe | |
| 4,574,786 A * | 3/1986 | Hashimoto | A61H 1/00 297/284.1 |
| 5,020,518 A | 6/1991 | Spears et al. | |
| 5,233,973 A | 8/1993 | Gill et al. | |
| 5,304,112 A | 4/1994 | Mrklas et al. | |
| 5,407,330 A | 4/1995 | Rimington et al. | |
| 5,769,799 A | 6/1998 | Daughtry | |
| 5,792,047 A | 8/1998 | Coggins | |
| 5,827,205 A * | 10/1998 | Iwamoto | A61H 23/0218 601/78 |
| 5,876,359 A | 3/1999 | Bock et al. | |
| 5,927,811 A * | 7/1999 | Tseng | A47C 1/0308 297/353 |
| 5,993,401 A | 11/1999 | Inbe et al. | |
| 6,045,191 A * | 4/2000 | Piretti | A47C 1/0308 297/411.37 |
| 6,056,707 A | 5/2000 | Hayashi | |
| 6,168,392 B1 | 1/2001 | Takano | |
| 6,171,266 B1 | 1/2001 | Inada et al. | |
| 6,224,563 B1 | 5/2001 | Nonoue et al. | |
| 6,312,400 B1 | 11/2001 | Itikawa et al. | |
| 6,394,970 B1 | 5/2002 | Maier | |
| 6,491,652 B1 | 12/2002 | Hata et al. | |
| 6,494,850 B1 | 12/2002 | Kitadou et al. | |
| 6,511,446 B1 * | 1/2003 | Wu | A61F 7/02 601/15 |
| 6,511,448 B1 | 1/2003 | Furuie et al. | |
| 6,540,701 B1 | 4/2003 | Inada | |
| 6,568,058 B1 * | 5/2003 | Wieland | A47C 4/021 29/525.03 |
| 6,599,261 B1 | 7/2003 | Chen | |
| 6,629,939 B2 | 10/2003 | Jikiba et al. | |
| 6,656,140 B2 | 12/2003 | Oguma et al. | |
| 6,695,799 B2 | 2/2004 | Kitadou et al. | |
| 6,749,577 B2 | 6/2004 | Kume et al. | |
| 6,840,914 B1 | 1/2005 | Takamura | |
| 6,899,687 B2 | 5/2005 | Hori et al. | |
| 6,969,361 B2 | 11/2005 | Hsieh | |
| 6,991,609 B2 | 1/2006 | Kan et al. | |
| 7,081,099 B1 | 7/2006 | Luo | |
| 7,195,604 B2 | 3/2007 | Nakamura et al. | |
| 7,549,966 B2 | 6/2009 | Fujii et al. | |
| 7,717,868 B2 | 5/2010 | Inada et al. | |
| 7,744,548 B2 | 6/2010 | Chen | |
| 7,789,466 B2 | 9/2010 | Yoda et al. | |
| 7,806,840 B2 | 10/2010 | Chen | |
| 7,828,756 B2 | 11/2010 | Kamba et al. | |
| 7,854,710 B2 | 12/2010 | Liang | |
| 7,947,002 B2 | 5/2011 | Mizoguchi et al. | |
| 9,173,804 B2 | 11/2015 | Ishikawa et al. | |
| 9,549,867 B1 | 1/2017 | El-Messeiry et al. | |
| 2002/0014795 A1 * | 2/2002 | Williams | A47C 1/023 297/337 |
| 2002/0138023 A1 | 2/2002 | Kume et al. | |
| 2002/0068887 A1 | 6/2002 | Kikumoto et al. | |
| 2002/0106282 A1 * | 8/2002 | Sharp | F04B 39/0033 417/201 |
| 2002/0193713 A1 | 12/2002 | Lee | |
| 2004/0097854 A1 * | 5/2004 | Hester | A61H 23/04 601/149 |
| 2004/0122343 A1 | 6/2004 | Mori et al. | |
| 2004/0158181 A1 | 8/2004 | Watanabe et al. | |
| 2005/0010144 A1 | 1/2005 | Chen | |
| 2005/0031458 A1 * | 2/2005 | Brashears | B25H 3/006 417/234 |
| 2005/0088028 A1 | 4/2005 | Wan et al. | |
| 2005/0090769 A1 | 4/2005 | Chen | |
| 2005/0101892 A1 | 5/2005 | Dehli | |
| 2005/0113723 A1 | 5/2005 | Ueyama et al. | |
| 2005/0146176 A1 | 7/2005 | Yoda et al. | |
| 2005/0192520 A1 | 9/2005 | Morita et al. | |
| 2005/0242635 A1 | 11/2005 | Cassaday | |
| 2006/0069325 A1 | 3/2006 | Inada et al. | |
| 2006/0111653 A1 | 5/2006 | Nishio et al. | |
| 2006/0142676 A1 | 6/2006 | Fujii et al. | |
| 2006/0217641 A1 | 9/2006 | Tanizawa et al. | |
| 2006/0217643 A1 | 9/2006 | Yonekawa et al. | |
| 2006/0241536 A1 | 10/2006 | Yoda et al. | |
| 2007/0010767 A1 | 1/2007 | Hsieh | |
| 2007/0016119 A1 | 1/2007 | Inada et al. | |
| 2007/0106185 A1 | 5/2007 | Ferber et al. | |
| 2007/0120408 A1 * | 5/2007 | Hsieh | A47C 7/54 297/411.39 |
| 2007/0150554 A1 * | 6/2007 | Simister | H04L 41/0813 709/219 |
| 2007/0225624 A1 | 9/2007 | Tsukada et al. | |
| 2007/0239089 A1 | 10/2007 | Chiu | |
| 2007/0287941 A1 | 12/2007 | Yoda et al. | |
| 2007/0299377 A1 | 12/2007 | Shiraishi | |
| 2008/0009777 A1 | 1/2008 | Chiu | |
| 2008/0066988 A1 * | 3/2008 | Asp | B66F 9/0759 180/333 |
| 2008/0097260 A1 | 4/2008 | Tsukada et al. | |
| 2008/0183112 A1 | 7/2008 | Takebe | |
| 2008/0243040 A1 | 10/2008 | Kuwabara et al. | |
| 2009/0036809 A1 | 2/2009 | Nishio et al. | |
| 2009/0177128 A1 | 7/2009 | Fukuyama et al. | |
| 2009/0260639 A1 | 10/2009 | Hsu et al. | |
| 2009/0306555 A1 | 12/2009 | Goto | |
| 2009/0306558 A1 | 12/2009 | Chen | |
| 2010/0030121 A1 | 2/2010 | Fu | |
| 2010/0198120 A1 * | 8/2010 | Tago | A61H 1/0237 601/134 |
| 2010/0198121 A1 | 8/2010 | Tago et al. | |
| 2010/0249613 A1 * | 9/2010 | Hashimoto | A61B 5/0245 600/485 |
| 2010/0312155 A1 | 12/2010 | Fukuyama et al. | |
| 2010/0318004 A1 | 12/2010 | Numata et al. | |
| 2011/0015554 A1 * | 1/2011 | Morikawa | A61H 1/0244 601/84 |
| 2011/0055720 A1 | 3/2011 | Potter et al. | |
| 2011/0077561 A1 | 3/2011 | Choly | |
| 2011/0082400 A1 | 4/2011 | Wu | |
| 2011/0213503 A1 * | 9/2011 | Porter, III | A61G 5/1043 700/282 |
| 2012/0071799 A1 | 3/2012 | Inada et al. | |
| 2012/0095375 A1 | 4/2012 | Ishiguro et al. | |
| 2012/0157899 A1 | 6/2012 | Terada et al. | |

(56) References Cited

U.S. PATENT DOCUMENTS

| | | | |
|---|---|---|---|
| 2012/0212018 A1 | 8/2012 | Ishikawa et al. | |
| 2012/0215143 A1* | 8/2012 | Inada | A61H 1/003 601/112 |
| 2013/0088059 A1 | 4/2013 | Nagamitsu | |
| 2014/0343467 A1 | 11/2014 | Fukuyama et al. | |
| 2015/0051526 A1 | 2/2015 | Wang et al. | |
| 2015/0141887 A1* | 5/2015 | Kawashima | A61H 9/0078 601/149 |
| 2015/0157528 A1 | 6/2015 | Le et al. | |
| 2015/0169124 A1 | 6/2015 | Le et al. | |
| 2015/0313790 A1 | 11/2015 | Inada et al. | |
| 2015/0351997 A1 | 12/2015 | Le et al. | |
| 2015/0366746 A1 | 12/2015 | Ashby | |
| 2016/0106620 A1 | 4/2016 | Uno et al. | |
| 2016/0229320 A1 | 8/2016 | Lem et al. | |
| 2016/0282040 A1* | 9/2016 | Wenji | F25D 31/006 |
| 2017/0056280 A1 | 3/2017 | Ode | |
| 2017/0290739 A1* | 10/2017 | Shin | A61H 9/0078 |
| 2017/0293281 A1* | 10/2017 | Li | G05B 19/16 |
| 2018/0335082 A1* | 11/2018 | Andersson | F16C 29/02 |

FOREIGN PATENT DOCUMENTS

| | | |
|---|---|---|
| CN | 101396322 | 4/2009 |
| CN | 101744707 B | 10/2011 |
| EP | 1230904 A2 | 8/2002 |
| EP | 1210927 B1 | 1/2005 |
| JP | 2551492 | 1/1994 |
| JP | H06209 A | 1/1994 |
| JP | H1119150 A | 1/1999 |
| JP | 11299570 | 11/1999 |
| JP | 2000342644 | 12/2000 |
| JP | 2001095867 | 4/2001 |
| JP | 2001309833 | 11/2001 |
| JP | 2002238963 | 8/2002 |
| JP | 2002240598 | 8/2002 |
| JP | 2004216120 | 8/2004 |
| JP | WO2009013870 | 1/2009 |
| KR | 200276429 Y1 * | 2/2002 |
| KR | 200438559 Y1 * | 2/2008 |
| KR | 20140013496 * | 4/2014 |
| KR | 101458685 | 11/2014 |
| KR | 101515586 B1 * | 4/2015 |
| WO | WO2012077842 | 6/2012 |

OTHER PUBLICATIONS

"How Massage Chairs Work," downloaded Sep. 12, 2013, <URL:http://electronics.howstuffworks.com/gadgets/home/massage-chair1.htm>.
"Osaki OS-4000 Instruction Manual," downloaded Sep. 12, 2013, <URL:http://www.hitechmassagechairs.com/PDF/OS-4000-Manual.pdf>.
"Luminous-spa-pedicure-chair-owner-manual," downloaded Aug. 15, 2016, <URL:http://uspedicurespa.com/resources/lexor/luminous-spa-pedicure-chair-owner-manual.pdf >.

* cited by examiner

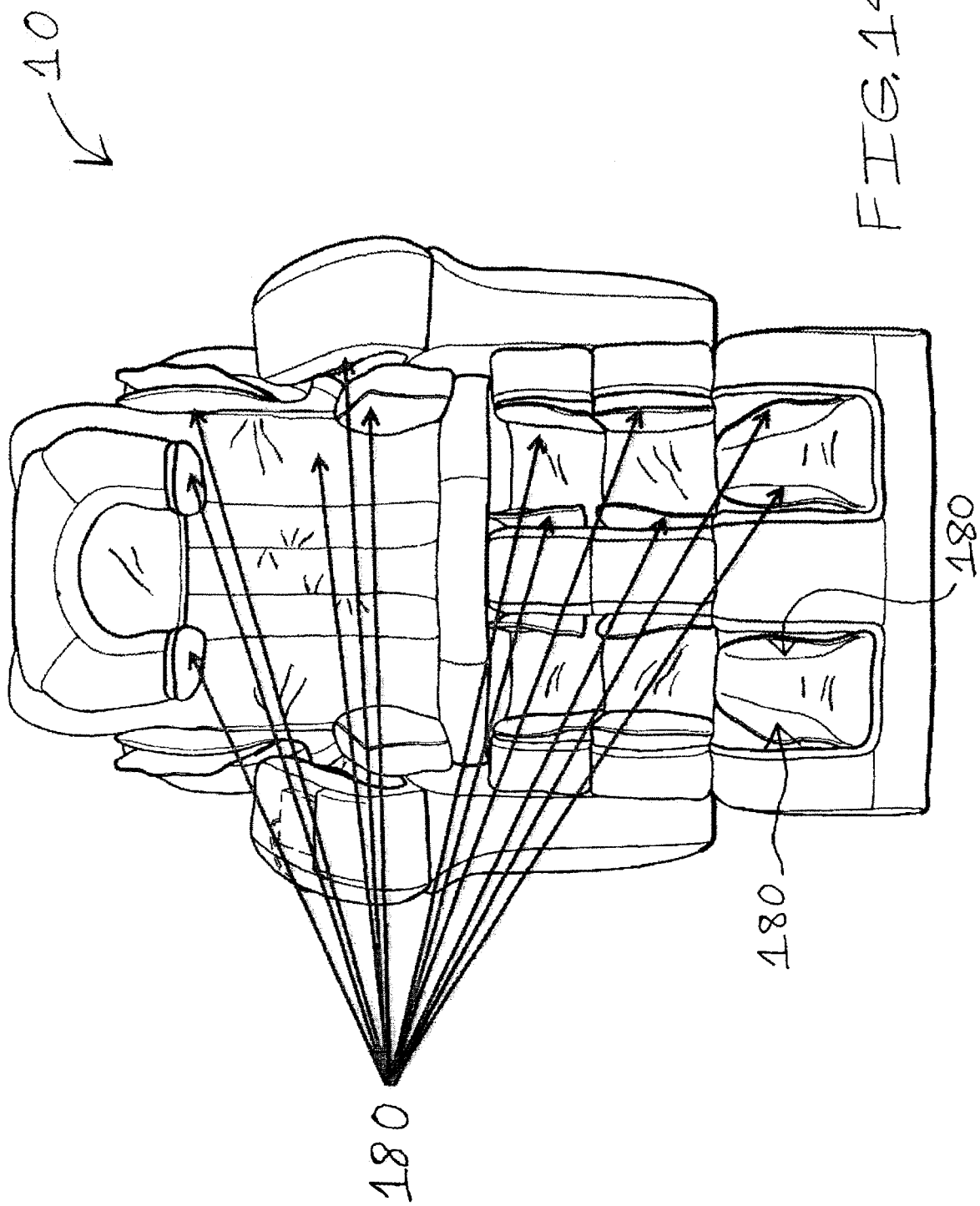

MASSAGE CHAIR HAVING A WIRELESS CHARGER, ARMREST SLIDING, HAMMERING DEVICES, AND OXYGEN GENERATION

CROSS REFERENCE TO PRIOR APPLICATIONS

This application is a continuation of U.S. patent application Ser. No. 16/283,186, filed Feb. 22, 2019, which is incorporated herein by reference in its entirety; which is a continuation in part of U.S. patent application Ser. No. 15/593,320, filed May 11, 2017 and issued as U.S. Pat. No. 10,724,549 on Jul. 28, 2020, which is incorporated herein by reference in its entirety.

BACKGROUND OF THE DISCLOSURE

Field of the Invention

The disclosure generally relates to massage chairs, massage devices and apparatuses for massage chairs, and noise-reducing devices and systems. More specifically, the disclosure is directed to a massage chair having a noise-reducing, enclosure device. Additionally, the disclosure is directed to a massage chair having hammering devices. Moreover, the disclosure is directed to a massage chair having heated acupuncture devices. Additionally, the disclosure is directed to an oxygen generator for generating oxygen for user. Moreover, the disclosure is directed to a massage chair having a remote control pouch and a wireless device pouch having wireless charging functionality. Additionally, the disclosure is directed to voice recognition control of the massage chair.

Description of the Related Art

Massage chairs, massage devices and apparatuses for massage chairs, and noise-reducing devices and systems are known in the art.

In many current massage systems and devices related to massage chairs, the massage system or device usually has an air compressor to pump air into the air cells or bags throughout the massage chair to provide massage effects to users of the massage chair at air massage pressure points. Due to the electro-mechanical movement to generate the compressed air, the air compressor can make a very unpleasant noise when it operates. In addition, the air valves' operation to control the air flow into and out of air cells are also noisy. Thus, a massage chair having a noise-reducing, device or system is desired for reducing noise generated from and/or made by these devices so as to make the massage environment more quiet and relaxing for users of the massage chair.

The disclosure overcomes one or more of the shortcomings of massage chairs, massage devices and apparatuses for massage chairs, and noise-reducing devices and systems. The Applicant is unaware of inventions or patents, taken either singly or in combination, which are seen to describe the disclosure as claimed. Additionally, the disclosure provides additional features for improving user experience including hammering devices, heating acupuncture devices, oxygen generation, voice recognition control of the massage chair, a remote control pouch, and a wireless device pouch having wireless charging functionality.

SUMMARY OF THE DISCLOSURE

The disclosure is directed to a massage chair having a massage chair frame, a massage system that includes a plurality of air massage elements, and a noise-reducing (or noise-absorbing, noise-containing or noise-cancelling) enclosure device. Additionally, the disclosure is directed to additional features for improving user experience including hammering devices, heating acupuncture devices, oxygen generation, voice recognition control of the massage chair, a remote control pouch, and a wireless device pouch having wireless charging functionality.

The massage chair frame includes a first end, a second end, a seat or bottom body area portion, and a back body area portion extending upward from the seat or bottom body area portion toward the second end. Preferably, the massage chair frame also includes a thigh body area portion located between the seat or bottom body area portion and the first end, a head and neck body area portion extending upward from the back body area portion and located about the second end, and a lower leg body area portion located downward (or extending downward) from the thigh body area portion and located about the first end.

The massage system includes at least one air massage element, an air compressor or pump, and at least one air valve device for regulating air flow into and out of the at least one air massage element. Preferably, the massage system also comprises at least one air transport device and a power source. Also preferably, the at least one air massage element is a plurality of air massage elements, the at least one air valve device is a plurality of air valve devices, and the at least one air transport device is a plurality of air transport devices. The massage system is in operational communication with the massage chair frame such that the massage system provides massaging effects to a user positioned in the massage chair.

Each of the plurality of air massage elements is adapted for having air transported or pumped into it by the air compressor or pump and for having air withdrawn from it. The plurality of air massage elements may be positioned at predetermined massage locations on, about, or in the vicinity of the massage chair frame and/or may be moved or transported to desired massage locations by the user.

The air compressor or pump pumps air into the plurality of air massage elements such that massaging effects can be provided to the user at desired massage locations or pressure points.

The plurality of air valve devices regulate air flow into and out of the plurality of air massage elements.

The plurality of air transport devices transport air flow into and out of the plurality of air massage elements.

The power source provides power to the air compressor or pump, and may also be used to provide power to other components of the massage chair.

The noise-reducing (or noise-absorbing, noise-containing, or noise-cancelling) enclosure device includes an enclosure housing. The enclosure housing may comprise a layer of noise-reducing (or noise-absorbing, noise-containing, or noise-cancelling) material positioned inside. The enclosure housing encloses the air compressor or pump and the plurality of air valve devices during operation. The noise-reducing, enclosure device is preferably positioned in proximity of the massage chair frame.

The enclosure housing encloses the air compressor or pump and the plurality of air valve devices during operation such that noise generated from or made by the air compressor or pump and the plurality of air valve devices during operation is reduced, contained or eliminated.

Preferably, the noise-reducing (or noise-absorbing, noise-containing, or noise-cancelling) material is positioned inside the enclosure housing in such a way that it surrounds the air compressor or pump and the plurality of air valve devices such that noise generated from or made by the air compressor or pump and the plurality of air valve devices during operation is reduced, contained or eliminated.

BRIEF DESCRIPTION OF THE DRAWINGS

FIG. 14 is an elevated, front view of a massage chair, showing multiple locations where air massage elements may be positioned.

Figure 1:
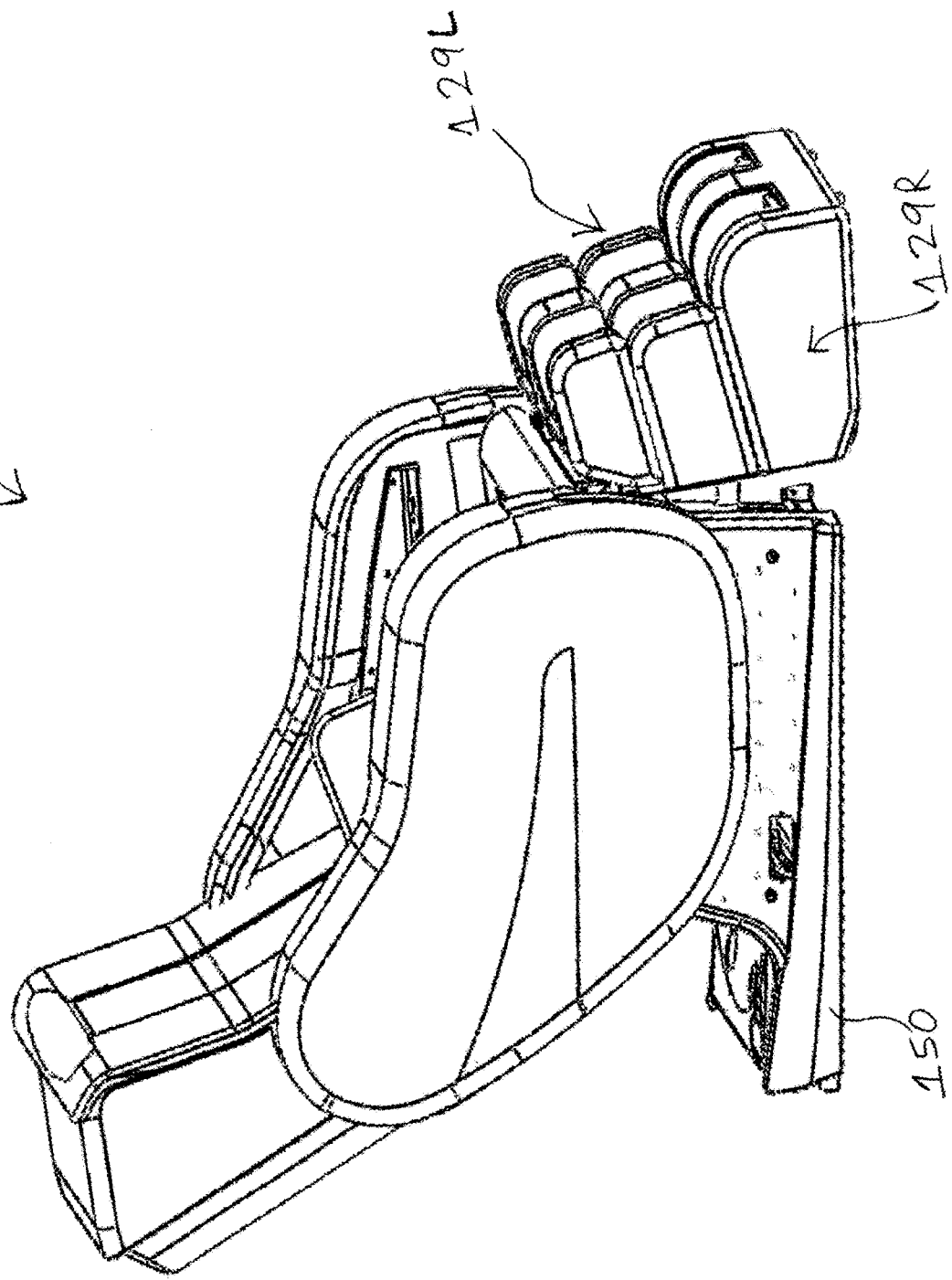
FIG. 1 is a right side, perspective view of a massage chair according to the disclosure.

It should be understood that the above-attached figures are not intended to limit the scope of the disclosure in any way.

DETAILED DESCRIPTION OF THE PREFERRED EMBODIMENTS

Referring to FIGS. 1-14, the disclosure is directed to a massage chair 10 having a massage chair frame 110, a massage system 170 that includes a plurality of air massage elements 180, and a noise-reducing (or noise-absorbing, noise-containing or noise-cancelling) enclosure device 230.

The massage chair frame 110 may include a first end, a second end, a seat or bottom body area portion, and a back body area portion extending upward from the seat or bottom body area portion toward the second end. Preferably, the massage chair frame 110 also includes a thigh body area portion located between the seat or bottom body area portion and the first end, a head and neck body area portion extending upward from the back body area portion and located about the second end, and a lower leg body area portion located downward (or extending downward) from the thigh body area portion and located about the first end. In general, the massage chair frame 110 may be any massage chair frame known to one of ordinary skill in the art that comprises at least a seat or bottom body area portion and a back body area portion.

Figure 2:
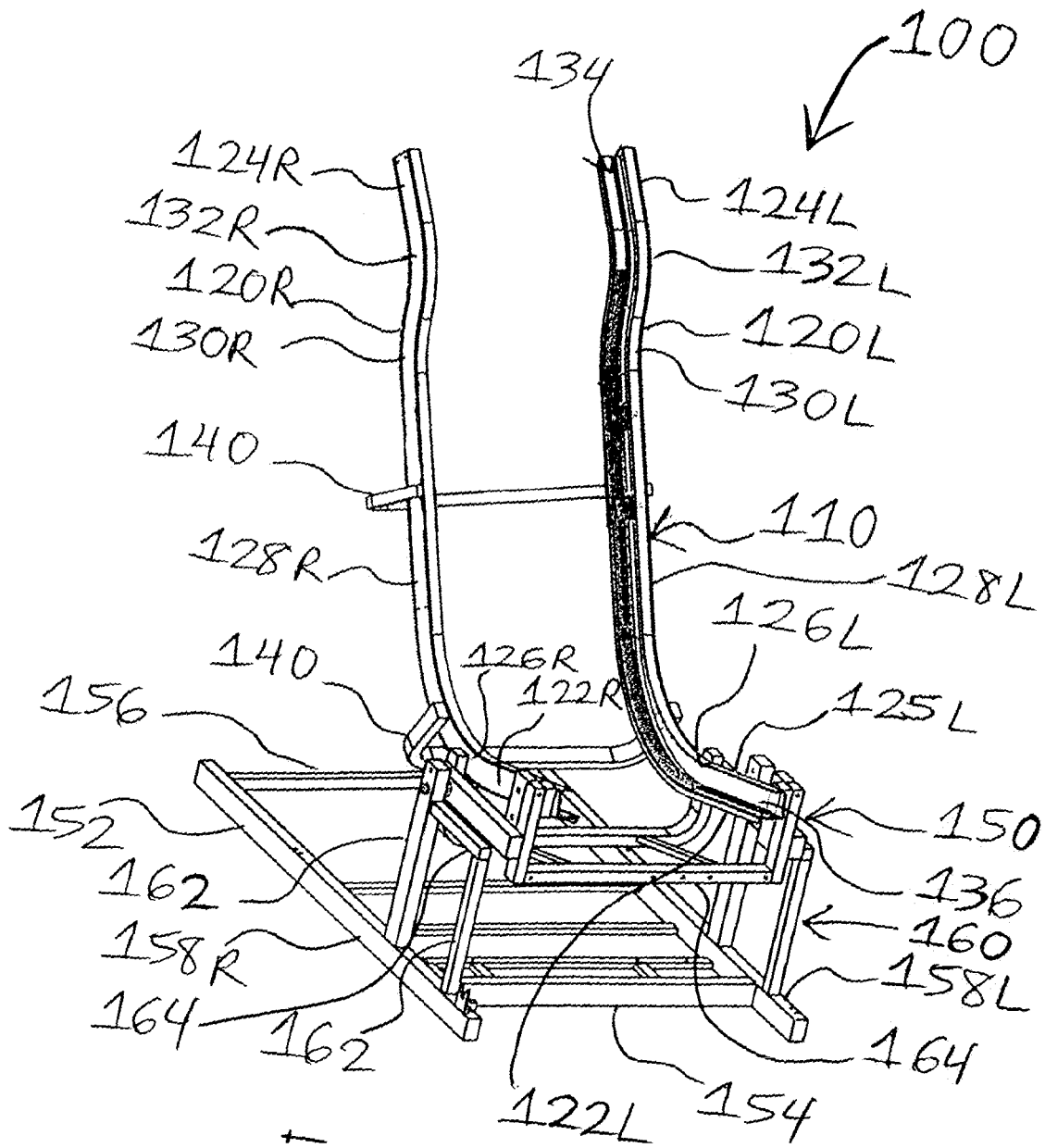
FIG. 2 is a perspective view of a massage chair frame for a massage chair according to the disclosure.
Figure 3:
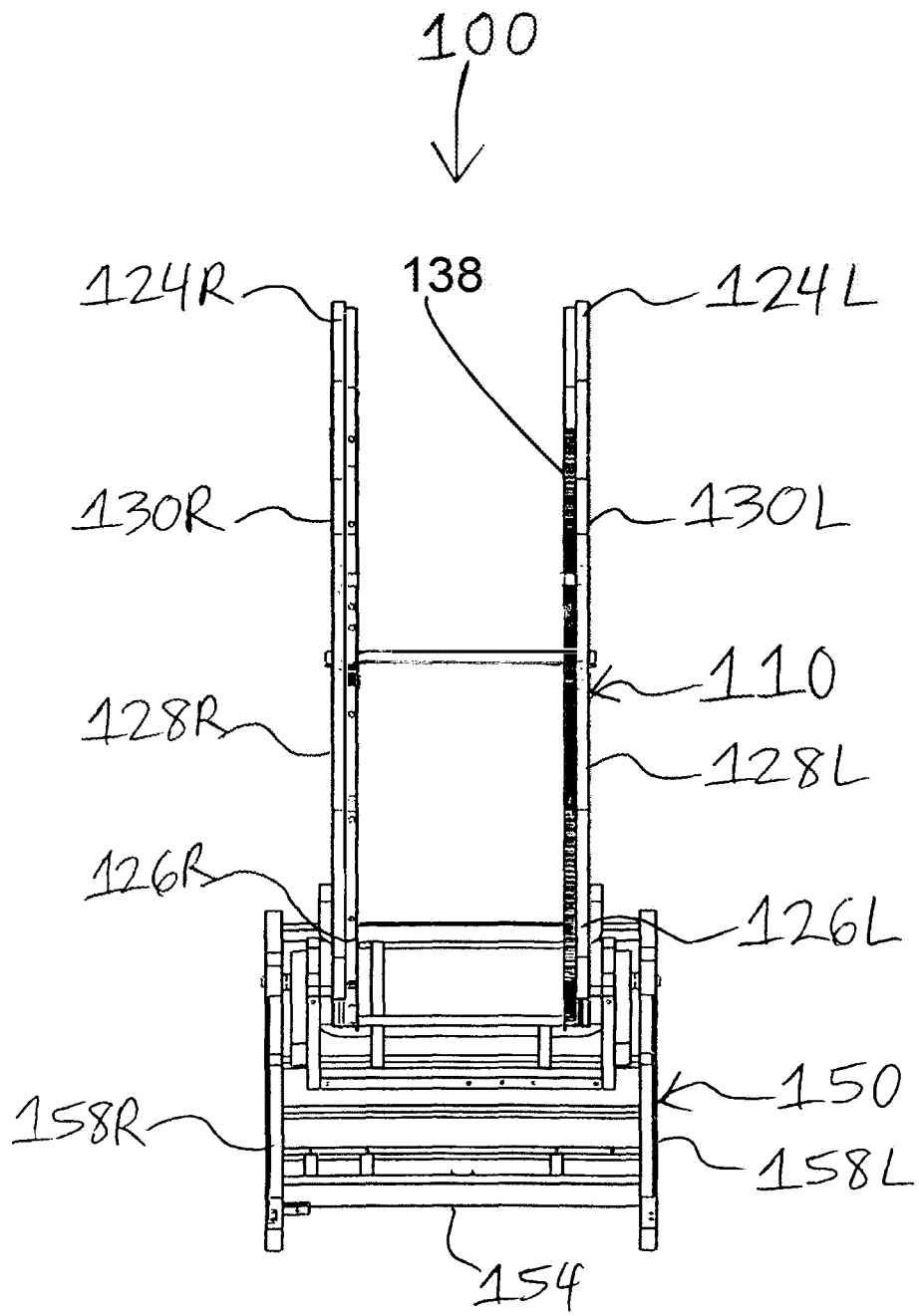
FIG. 3 is a front view of the massage chair frame of FIG. 2.
Figure 4:
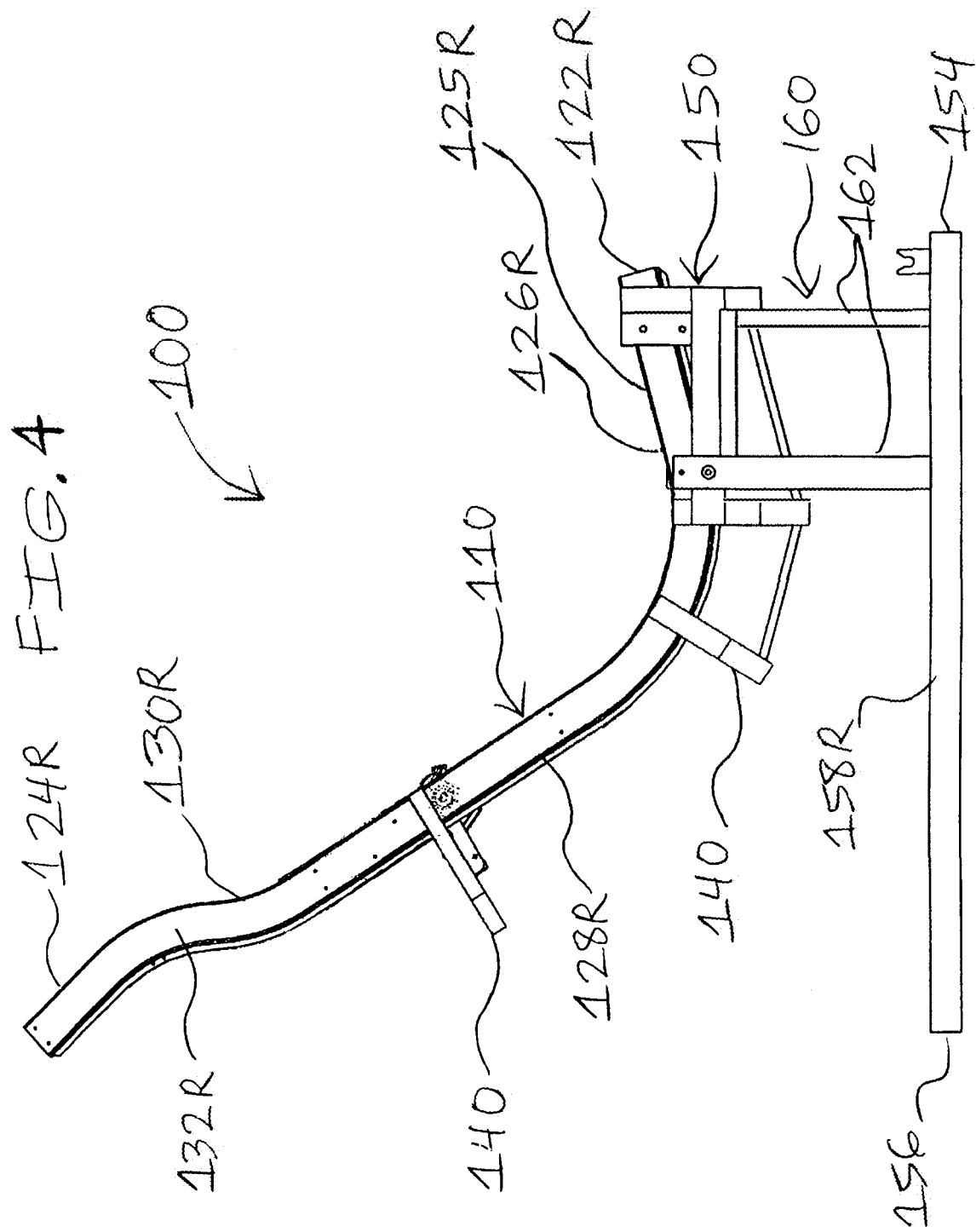
FIG. 4 is a right side view of the massage chair frame of FIG. 2.
Figure 5:
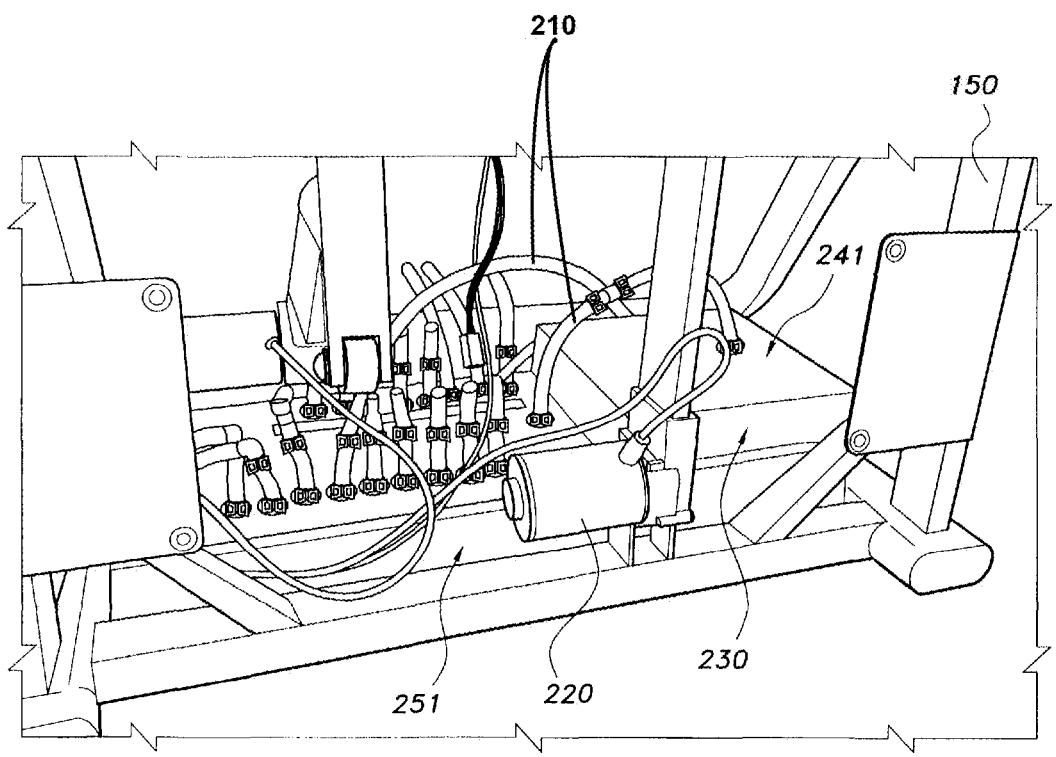
FIG. 5 is a rear, partial perspective view of a massage chair frame and a massage system of a massage chair according to the disclosure.
Figure 6:
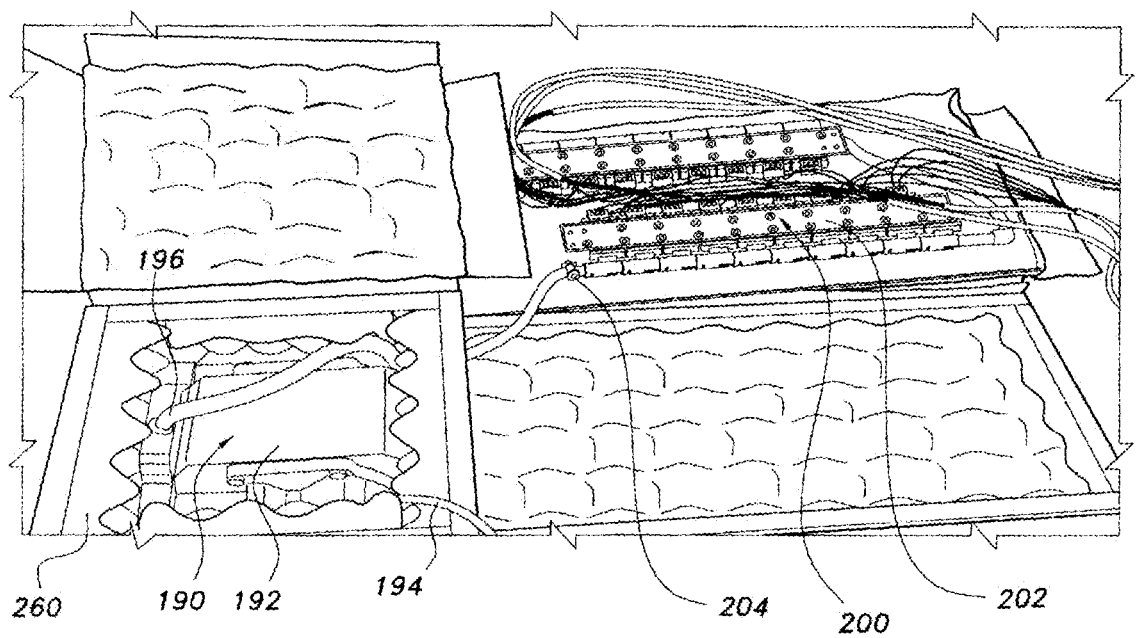
FIG. 6 is a top, partial perspective view of a massage system and a noise-reducing, enclosure device of a massage chair according to the disclosure.
Figure 7:
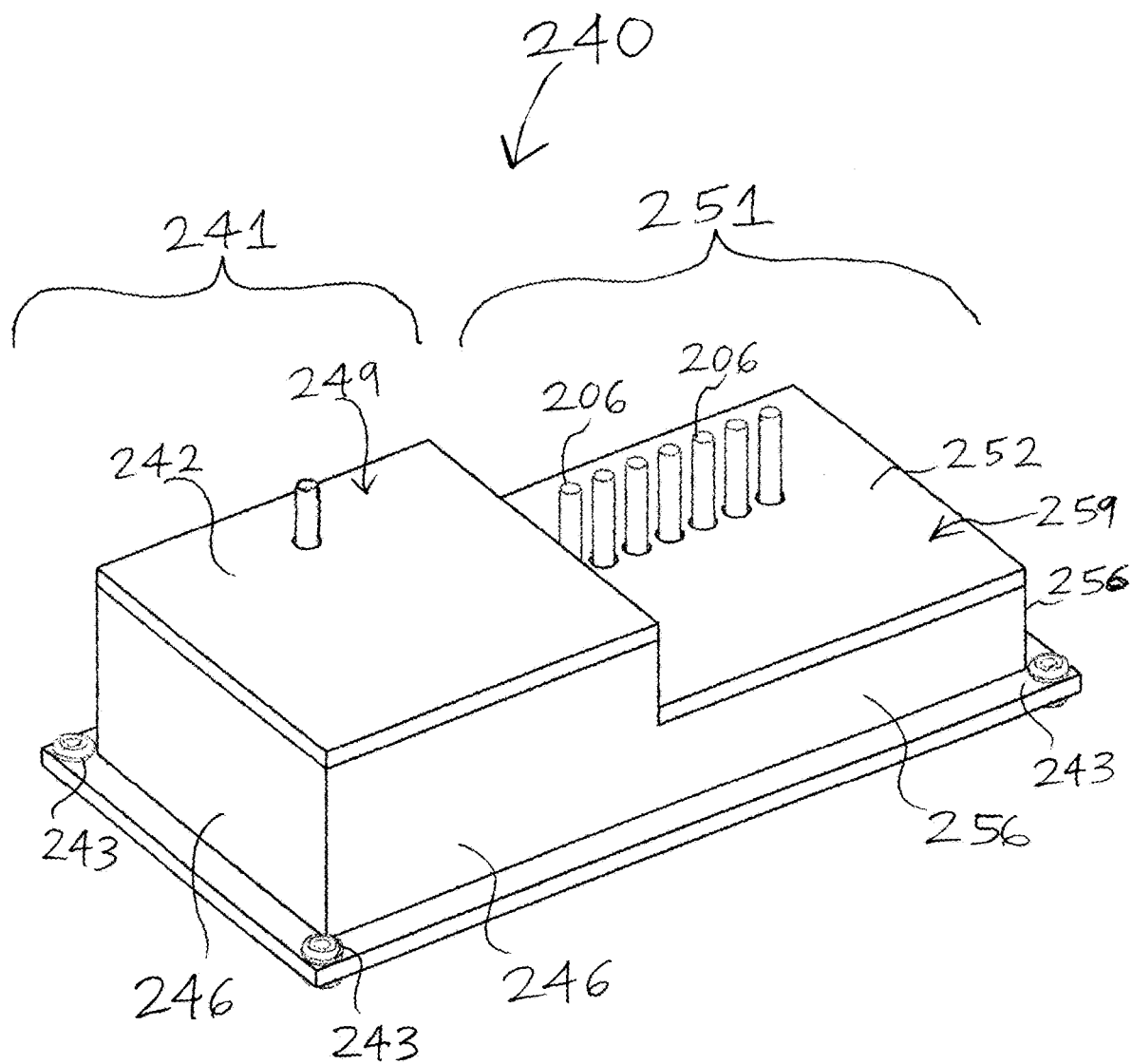
FIG. 7 is a top, perspective view of the noise-reducing, enclosure device of FIG. 6.
Figure 8:
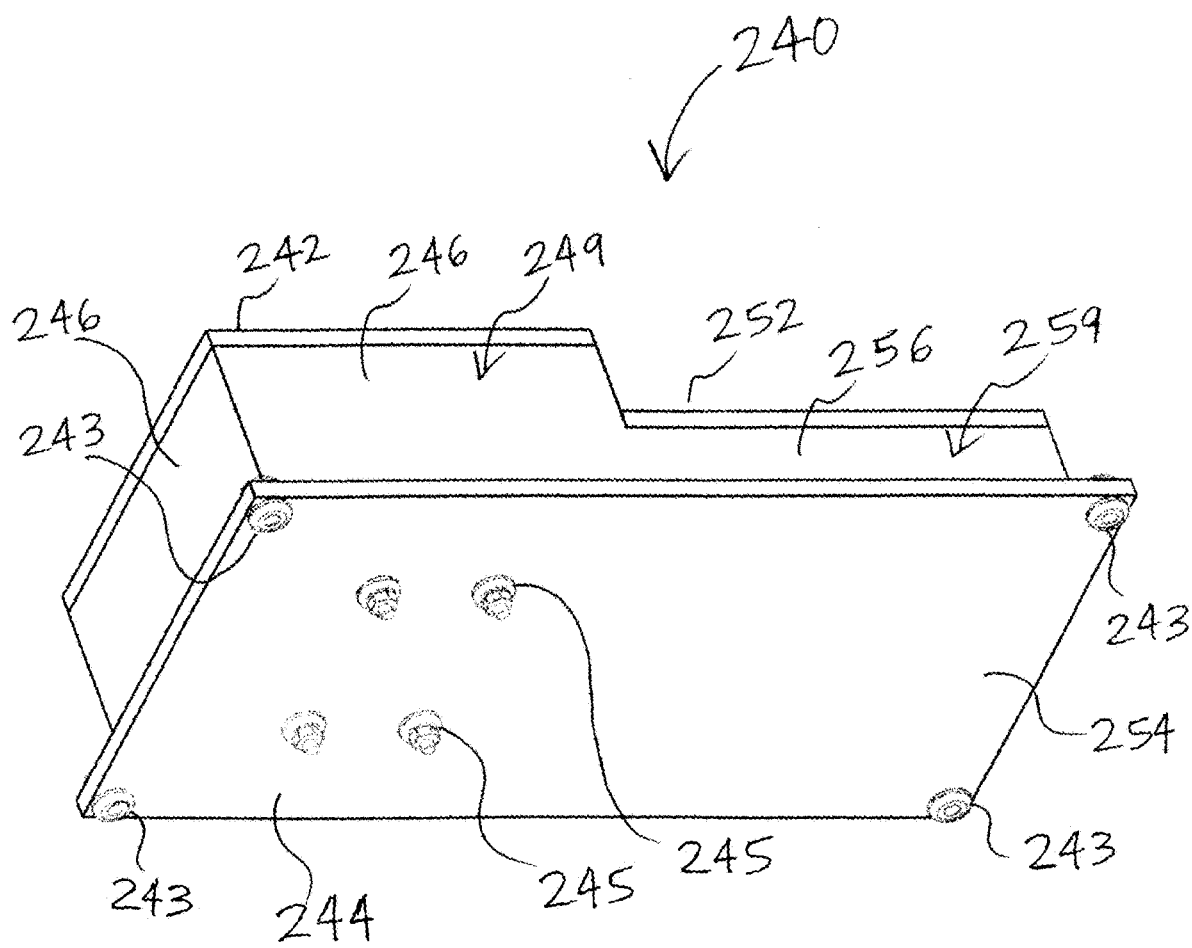
FIG. 8 is a bottom, perspective view of the noise-reducing, enclosure device of FIG. 6.
Figure 9:
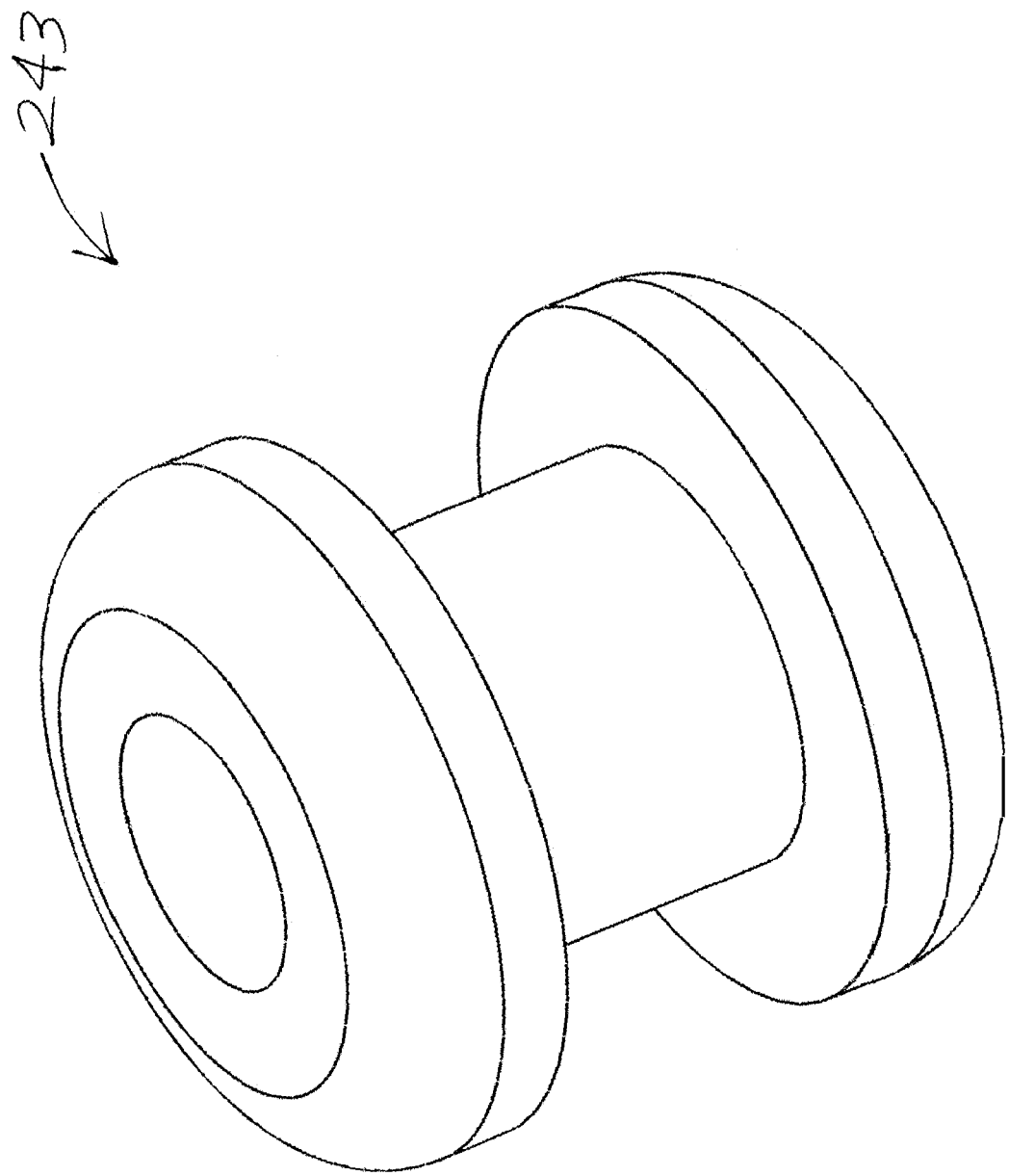
FIG. 9 is a perspective view of a securing nut of the noise-reducing, enclosure device of FIG. 6.

As a non-limiting example and as best shown in FIGS. 2-4, the massage chair frame 110 includes a pair of opposing guide rails 120R,120L, a plurality of guide rails stabilizing bars 140, and a base stand 150. The guide rails 120R,120L are secured to the base stand 150, and are positioned generally above the base stand 150. The base stand 150 supports the weight of the guide rails 120R,120L and, preferably, also the weight of a user (not shown) of the massage chair.

Preferably, the guide rails 120R,120L are substantially similar or mirror images of one another. Each of the guide rails 120R,120L includes a first end 122R,122L, a second end 124R,124L, a thigh body area portion 125R,125L located adjacent the first end 122R,122L, a seat or bottom body area portion 126R,126L located adjacent the thigh body area portion 125R,125L and away from the first end 122R,122L, a back body area portion 128R,128L extending upward from the bottom body area portion 126R,126L, a head and neck body area portion 130R,130L extending upward from the back body area portion 128R,128L and located about the second end 124R,124L, an outer side 132R,132L, an inner side 134, and a guide channel 136 extending from the thigh body area portion 125R,125L to the back body area portion 128R,128L, preferably to the head and neck body area portion 130R,130L, and running along the inner side 134 of the guide rail 120R,120L. The guide channel 136 may include gear teeth 138 for engaging with at least one gear member from a mechanical massage device (not shown) when the mechanical massage device moves upward and downward in a generally vertical direction from the first end 122R,122L toward the second end 124R,124L of the guide rail 120R,120L and vice versa, respectively. Preferably, each of the guide rails 120R,120L has a generally "L-shaped" configuration. In this configuration, the lower portion of the "L" includes the thigh body area portion 125R,125L and bottom body area portion 126R,126L, and the upper portion of the "L" includes the back body area portion 128R,128L and head and neck body area portion 130R,130L. As best shown in FIGS. 1 and 3, more preferably, each of the guide rails 120R,120L has a reclining "L-shaped" configuration.

Preferably, as shown in FIG. 1, the lower leg body area portion 129R,129L is a further extension of the massage chair frame 110, or is an add-on device that is secured or attached about the first end 122R,122L of the guide rails 120R,120L of the massage chair frame 110. Preferably, the lower leg body area portion 129R,129L is located downward (or extending downward) from the thigh body area portion 125R,125L and located downward (or extending downward) from the first end 122R,122L.

The plurality of guide rails stabilizing bars 140 help to stabilize the positioning of the guide rails 120R,120L relative to one another. Each of the guide rails stabilizing bars 140 has a first end 142, a second end 144, and a body portion 146 extending from the first end 142 to the second end 144. Preferably, each of the guide rails stabilizing bars 140 has a generally "U-shaped" configuration. The guide rails stabilizing bars 140 are secured at predetermined locations along the outer sides 132R,132L of the guide rails 120R,120L.

The base stand 150 includes a base 152 and a guide rails support structure 160. The base 152 includes a first or front end 154, a second or rear end 156, and a pair of opposing sides 158R,158L. The guide rails support structure 160 is secured about the front end 154 of the base 152, and is positioned above the base 152. The guide rails support structure 160 includes a plurality of vertical bars or vertical members 162 and a plurality of horizontal bars or members 164. The plurality of vertical bars 162 extend upward from the pair of opposing sides 158R,158L of the base 152, and, along with the plurality of horizontal bars 164, form a support frame with a "square-shaped" or "rectangular-shaped" box configuration.

Since the base stand 150 supports the weight of the guide rails 120R,120L and user of the massage chair, the base stand 150 is preferably made or manufactured of a strong material, such as, but not limited to, steel, metal, wood, hard plastic, any material or combination of materials known to one of ordinary skill in the art, and any combination thereof. Also, each of the guide rails 120R,120L and plurality of guide rails stabilizing bars 140 may be made or manufactured of steel, metal, wood, plastic, any material or combination of materials known to one of ordinary skill in the art, and any combination thereof.

As best shown in FIGS. 5, 6, 14, and 15, the massage system 170 includes at least one air massage element 180, an air compressor or pump 190, and at least one air valve device 200 for regulating air flow into and out of the at least one air massage element 180. Preferably, the massage system 170 also includes at least one air transport device 210 and an actuator 220. Also preferably, the at least one air massage element 180 is a plurality of air massage elements 180, the at least one air valve device 200 is a plurality of air valve devices 200, and the at least one air transport device 210 is a plurality of air transport devices 210. The massage system 170 is in operational communication with the massage chair frame 110 such that the massage system 170 provides massaging effects to a user (not shown) positioned in the massage chair 10.

Each of the plurality of air massage elements 180 is adapted for having air transported or pumped into it by the air compressor or pump 190 and for having air withdrawn from it. The plurality of air massage elements 180 may be positioned at predetermined massage locations on, about, or in the vicinity of the massage chair frame 110 and/or may be moved or transported to desired massage locations by the user. The plurality of air massage elements 180 may be a plurality of air massage cells (such as, but not limited to, air cell 180 shown in FIGS. 13A, 13B, and 13C), a plurality of air massage bags (such as, but not limited to, air bags), any air massage element(s) known to one of ordinary skill in the art, and any combination thereof. The air cell 180 includes an inflatable or expandable air cell housing 182, an air cell chamber 184 defined by the air cell housing 182, and an air cell inlet and outlet 186. The air that is contained in and/or pumped into and out of the plurality of air massage elements 180 may be air, a liquid, a gel, any air(s) known to one of ordinary skill in the art, and any combination thereof.

The air compressor or pump 190 pumps air into the plurality of air massage elements 180 such that massaging effects can be provided to the user at desired massage locations or pressure points. The air compressor or pump 190 comprises an air pump body 192, an air pump power source 194, and an air pump outlet 196. The air compressor or pump 190 (such as the non-limiting example shown in FIGS. 6, 10 and 11) may be any air compressor or pump known to one of ordinary skill in the art that is able to pump air, a liquid, a gel, any air(s) known to one of ordinary skill in the art, and any combination thereof into the plurality of air massage elements 180.

The plurality of air valve devices 200 regulate air flow into and out of the plurality of air massage elements 180. Each of the air valve device 200 comprises an air valve body 202, an air valve inlet 204, and an air valve outlet 206. Each of the plurality of air valve devices 200 (such as the non-limiting example shown in FIGS. 6, 10 and 11) may be any air valve device known to one of ordinary skill in the art that is able to regulate air flow into and out of the corresponding air massage element(s) 180.

The plurality of air transport devices 210 transport air flow into and out of the plurality of air massage elements 180. Each of the plurality of air transport devices 210 (such as the non-limiting example shown in FIGS. 13A, 13B, and 13C) may be any air transport device known to one of ordinary skill in the art that is able to transport air flow into and out of the corresponding air massage element(s) 180.

The power source 194 provides power to the air compressor or pump 190, and may also be used to provide power to other components of the massage chair 100. The power source 194 may be a battery, a connector or cord for plugging into a power outlet (such as, but not limited to, a detachable DC power supply cord), a plug for receiving power or electricity, any power source known to one of ordinary skill in the art, and any combination thereof.

As best shown in FIGS. 5-12, the noise-reducing (or noise-absorbing, noise-containing, or noise-cancelling) enclosure device 230 includes an enclosure housing 240 and noise-reducing (or noise-absorbing, noise-containing, or noise-cancelling) material 260 positioned inside the enclosure housing 240. The enclosure housing 240 encloses the air compressor or pump 190 and the plurality of air valve devices 200 during operation. The noise-reducing enclosure device 230 is preferably positioned in proximity of the massage chair frame 110. As a non-limiting example shown in FIGS. 1 and 5, the noise-reducing, enclosure device 230 is positioned below the seat or bottom body area portion 126R,126L of the massage chair frame 110.

As a non-limiting example and as best shown in FIGS. 6-11, the enclosure housing 240 has a first section 241 that includes a top 242, a bottom 244, a plurality of sides 246, an inner surface 248, and an outer surface 249, and a second section 251 that includes a top 252, a bottom 254, a plurality of sides 256, an inner surface 258, and an outer surface 259. Preferably, the inner surfaces 248, 258 and noise-reducing (or noise-absorbing, noise-containing, or noise-cancelling) material 260 help to form noise-reducing (or noise-absorbing, noise-containing, or noise-cancelling) walls for the enclosure housing 240. The first section 241 of the enclosure housing 240 encloses (partially, substantially, or fully encloses) the air compressor or pump 190 while the second section 251 of the enclosure housing 240 encloses (partially, substantially, or fully encloses) the plurality of air valve devices 200 such that noise generated from or made by the air compressor or pump 190 and the plurality of air valve devices 200 during operation is reduced, contained, or eliminated. The enclosure housing 240 also has a plurality of foot elements 243 positioned at predetermined locations on the periphery of the enclosure housing 240, and a plurality of screw and nut elements 245 positioned at predetermined locations.

Figure 10:
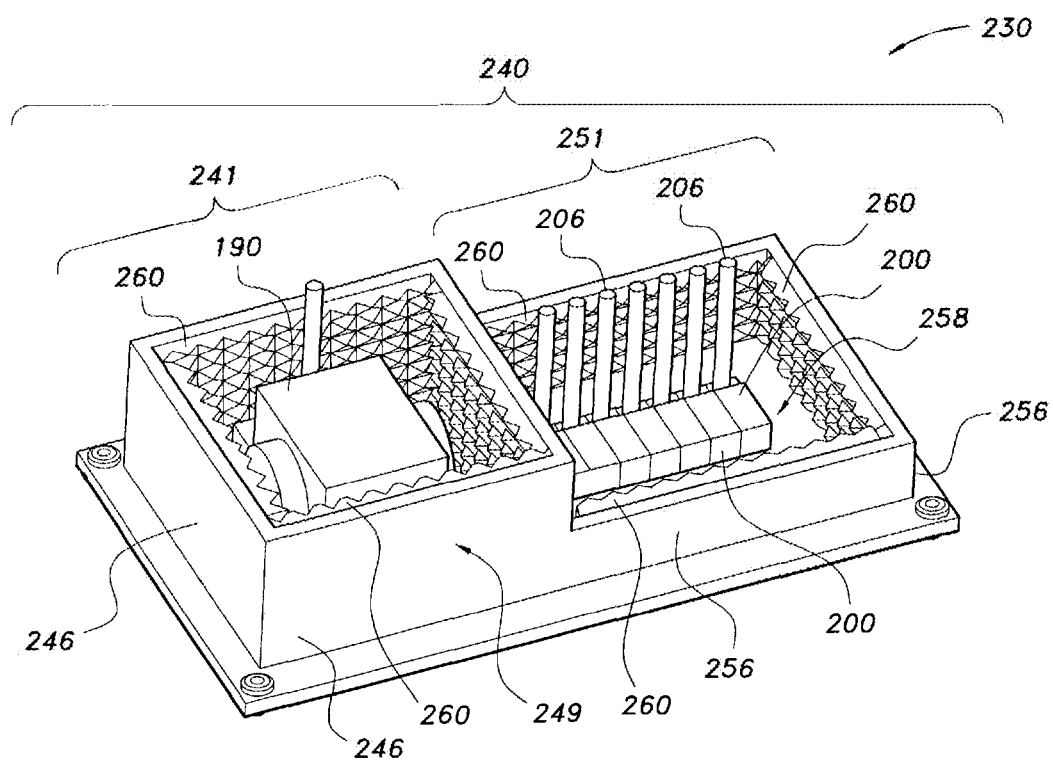
FIG. 10 is a top, perspective view of the massage system and the noise-reducing, enclosure device of FIG. 6, with a top of the noise-reducing, enclosure device being temporarily removed.
Figure 11:
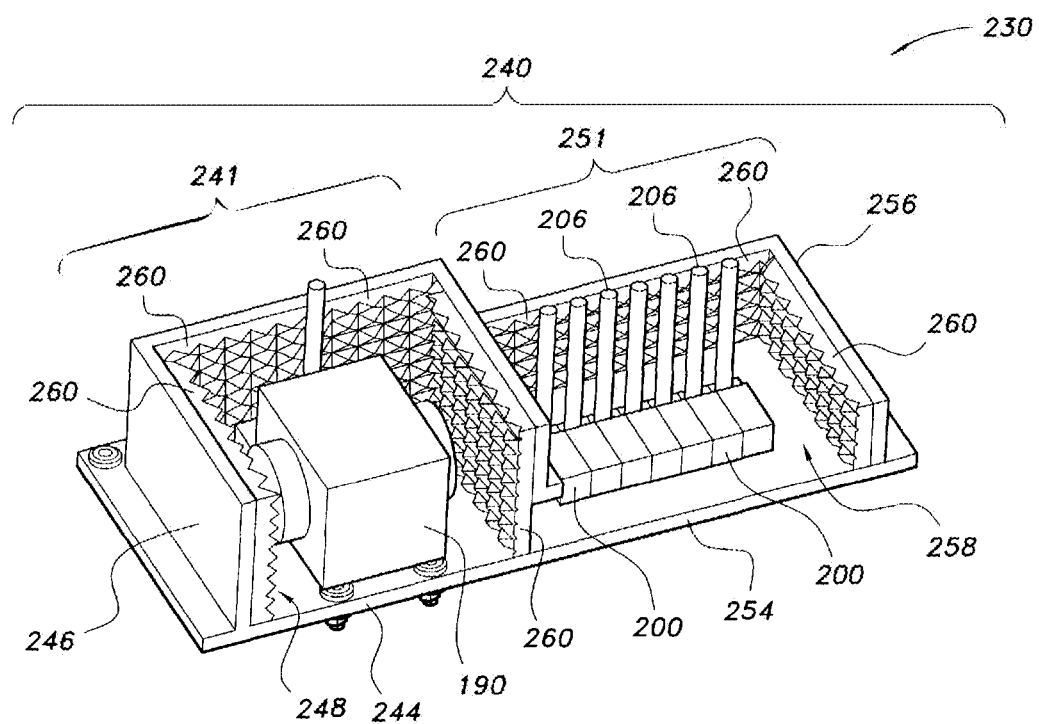
FIG. 11 is a partial cut-away, top, perspective view of the massage system and the noise-reducing, enclosure device of FIG. 6, with a top of the noise-reducing, enclosure device being temporarily removed.
Figure 12:
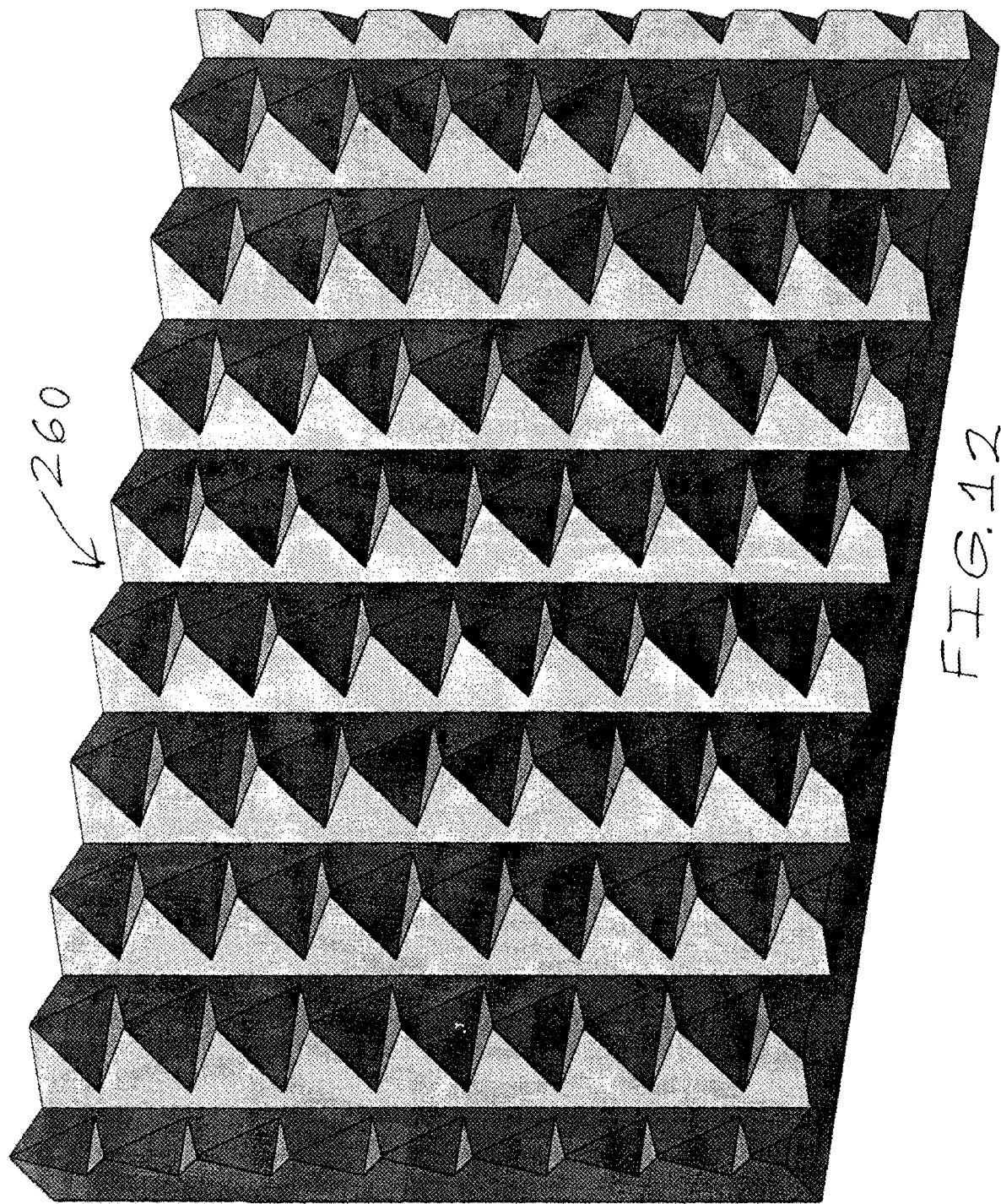
FIG. 12 is a perspective view of noise-reducing material of the noise-reducing, enclosure device of FIG. 6.

Preferably, the noise-reducing (or noise-absorbing, noise-containing, or noise-cancelling) material 260 is positioned inside the enclosure housing 240 in such a way that it surrounds the air compressor or pump 190 and the plurality of air valve devices 200 such that noise generated from or made by the air compressor or pump 190 and the plurality of air valve devices 200 during operation is reduced, contained or eliminated. Preferably, as shown in FIGS. 10 and 11, all of the inner surfaces 248, 258 of the enclosure housing 240 are covered by the noise-reducing material 260. Preferably, all of the electro-mechanical components positioned inside the enclosure housing 240 are fully surrounded by the noise-reducing material 260. The noise-reducing material 260 may be foam, noise-reducing foam, noise-absorbing foam, noise-containing foam, noise-cancelling foam, any noise-reducing material known to one of ordinary skill in the art, any noise-absorbing material known to one of ordinary skill in the art, any noise-containing material known to one of ordinary skill in the art, any noise-cancelling material known to one of ordinary skill in the art, and any combination thereof.

When in use or in operation, the user (not shown) may activate the massage system 170 of the massage chair 100 by or via pushing, touching, using voice command for use on or with, using a mechanical or remote control for use on or with, or any other activation method known to one of ordinary skill in the art, an activation, start, control or command button, touch area, box or panel, or any other activation method or element known to one of ordinary skill in the art. Preferably, the user is able to control the massage producing-effects of the plurality of air massage elements 180 such that the plurality of air massage elements 180 provide massage producing-effects to a desired body part area(s), such as the thighs, bottom, lower back, upper back, head and neck, and/or lower leg of the user so that desired body part area(s) of the user can receive massage effects or benefits from the plurality of air massage elements 180 when desired.

Figure 13A:
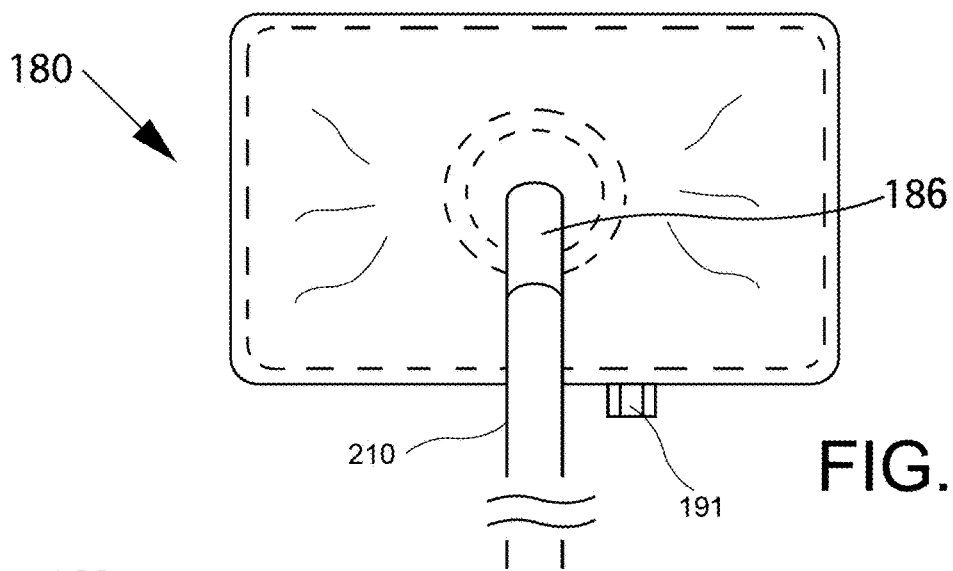
FIG. 13A is a side, perspective view of an air massage element and an air transport device of a massage system of a massage chair according to the disclosure.
Figure 13B:
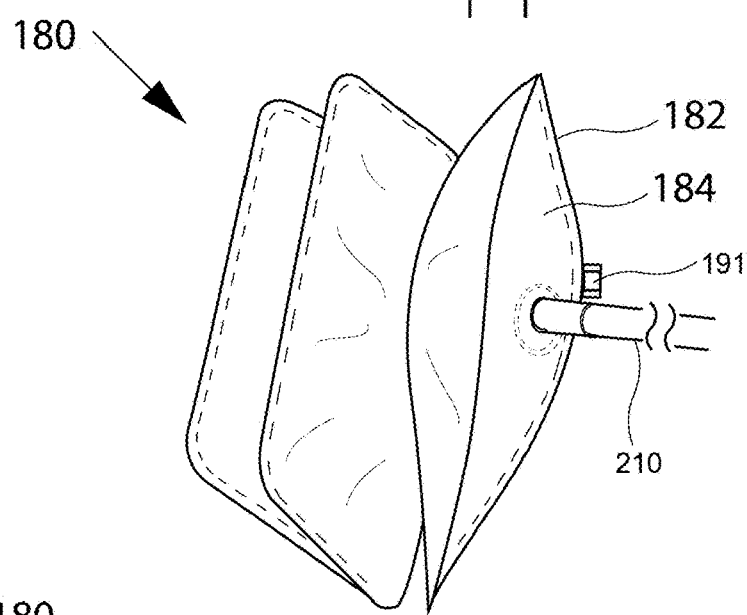
FIG. 13B is a perspective view of the air massage element and the air transport device of FIG. 13A.
Figure 13C:
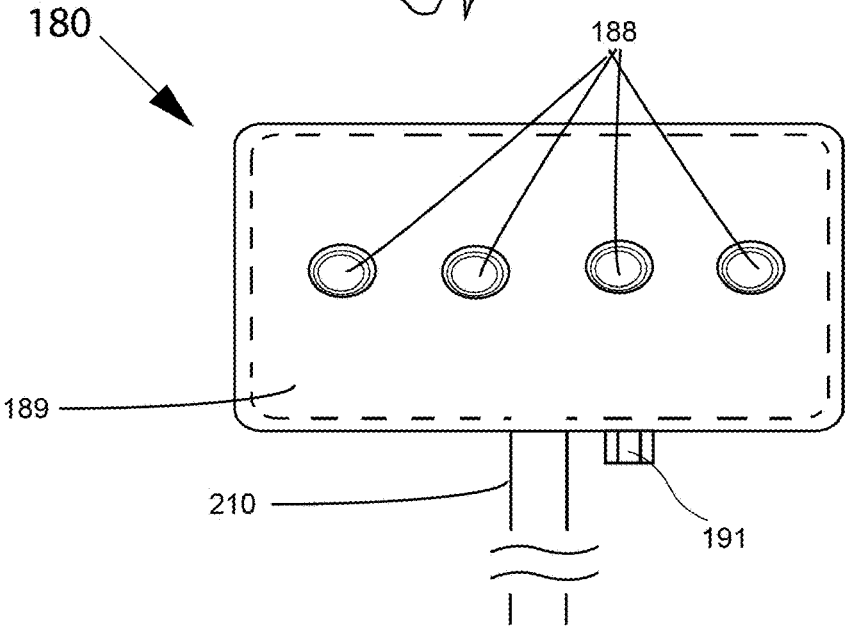
FIG. 13C is an opposite side, perspective view of an air massage element and an air transport device of a massage system of a massage chair according to the disclosure.

Additionally, FIG. 13A, FIG. 13B, and FIG. 13C further illustrate that the plurality of air massage elements 180 may include heating functionality. In this regard, as illustrated in FIG. 13C, the plurality of air massage elements 180 may include heated acupunctures 188. The heated acupunctures 188 may be located on an air cell front side 189. The heated acupunctures 188 may be located in other locations on or within the massage chair 10 as well. The heated acupunctures 188 may include a heating device to raise a temperature of the heated acupunctures 188. The heated acupunctures 188 may further include a power connector 191 to provide power to the heated acupunctures 188 for operating the heating device.

The heated acupunctures 188 may further include a circuit, a controller, or the like to control or vary a temperature of the heated acupunctures 188 in response to user input or a temperature sensor. In one aspect, the user input may be input to an input device. The input device may include switches, buttons, a touch sensitive screen, and the like. The user input may also include voice activation or voice control utilizing voice recognition software.

Figure 15:
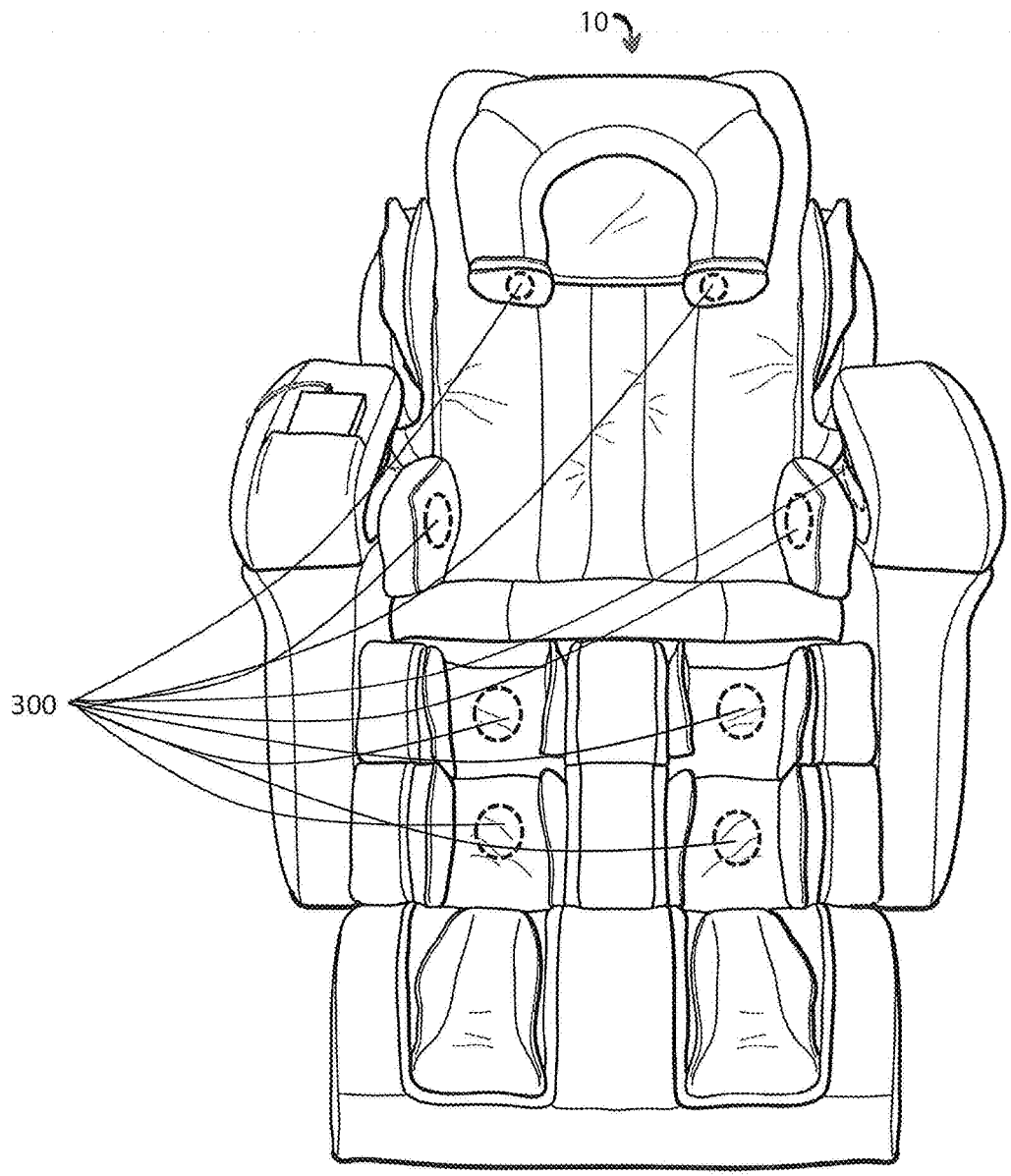
FIG. 15 is an elevated, front view of a massage chair, showing multiple locations where hammer punching devices may be positioned.

FIG. 15 is an elevated, front view of a massage chair, showing multiple locations where hammer punching devices may be positioned.

In particular, FIG. 15 illustrates the massage chair 10 having a plurality of hammer punching devices 300 located at various locations in the massage chair 10. In one aspect, one or more of the plurality of hammer punching devices 300 may be located adjacent headrest. In one aspect, one or more of the plurality of hammer punching devices 300 may be located adjacent a thigh area. In one aspect, one or more of the plurality of hammer punching devices 300 may be located adjacent an armrest area. In one aspect, one or more of the plurality of hammer punching devices 300 may be located adjacent a lower leg area. Other locations for the plurality of hammer punching devices 300 are contemplated as well.

In particular, the hammer punching devices 300 may provide a punching massage effect to a user positioned in the massage chair 10. In operation, the hammer punching devices 300 may provide a rapid movement and associated application of repeated pressure and/or impact to a user at various locations of the user's body. In this regard, the hammer punching devices 300 may provide a massaging affect to the user as they are sitting in the massage chair 10.

Figure 16:
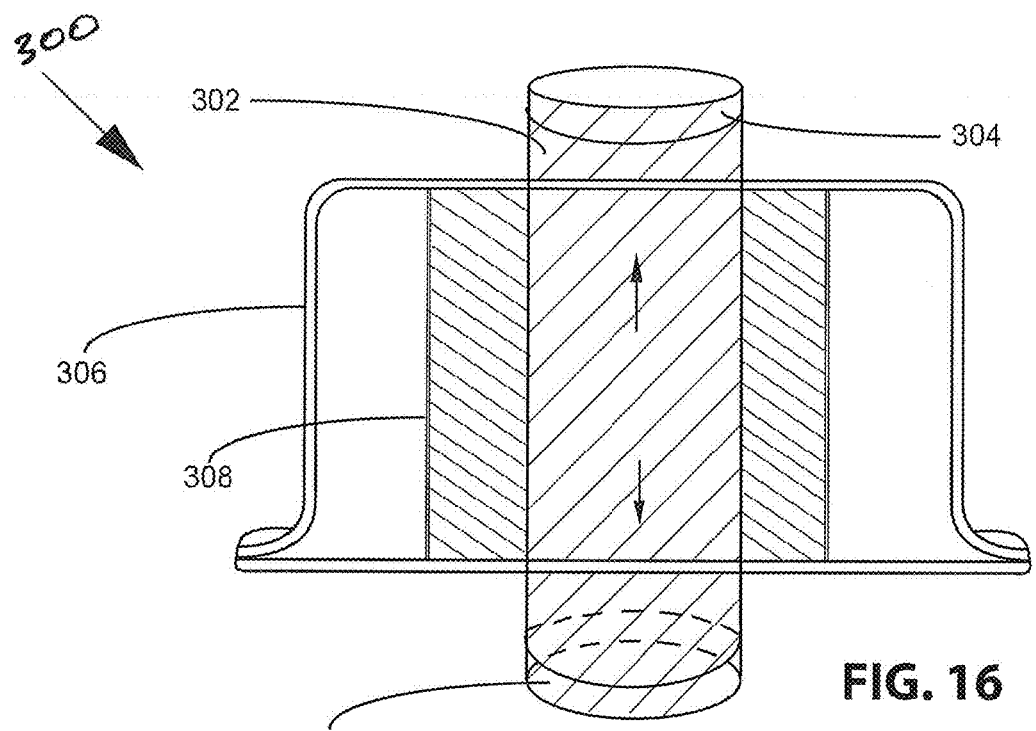
FIG. 16 illustrates a cross-sectional view of a hammer punching device according to the disclosure.
Figure 17:
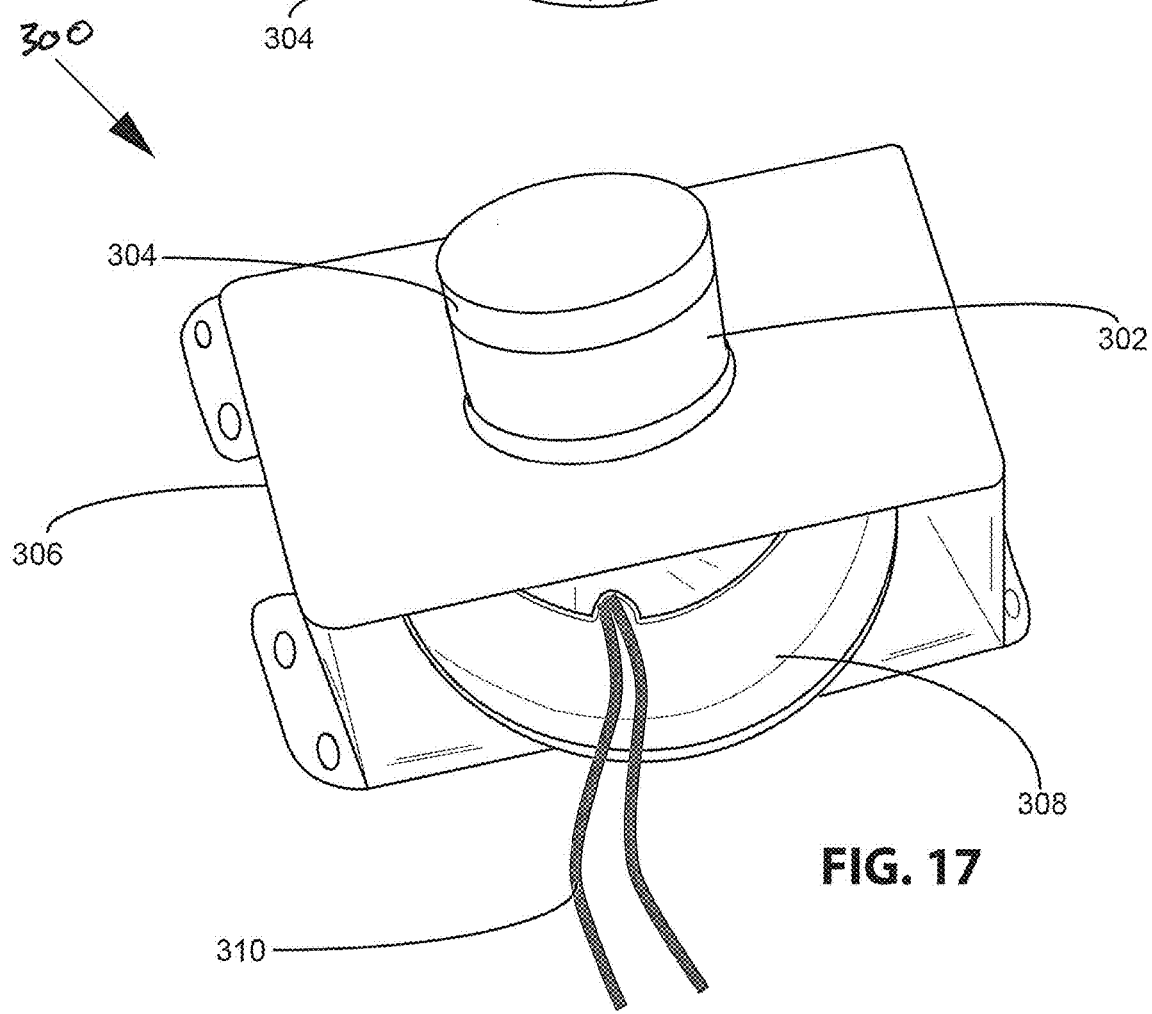
FIG. 17 illustrates a perspective view of a hammer punching device according to the disclosure.

FIG. 16 illustrates a cross-sectional view of a punching device according to the disclosure; and FIG. 17 illustrates a perspective view of a punching device according to the disclosure.

In particular, FIG. 16 and FIG. 17 illustrate details of one of the hammer punching devices 300. The hammer punching device 300 may include a punching cylinder 302 configured to move with respect to a housing 306 as indicated by the arrows in FIG. 16. One or both ends of the punching cylinder 302 may include a soft layer 304. The soft layer 304 may include leather, plastic, rubber, a synthetic material, or the like. In one aspect, the soft layer 304 may soften the impact of the punching cylinder 302 on a user.

The hammer punching device 300 may further include a coil 308 to move the punching cylinder 302 as indicated by the arrows when provided with power from a power supply 310. The power supply 310 may be an alternating current (AC) power supply or a direct current (DC) power supply. The hammer punching device 300 may further include a circuit, controller, microprocessor, or the like to control the hammer punching device 300. In particular, the hammer punching device 300 may be controlled such that the punching cylinder 302 has a particular range of motion, a frequency of movement, and a set amount of force. In one aspect, the hammer punching device 300 may be controlled by user input. In one aspect, the user input may be input to an input device. The input device may include switches, buttons, a touch sensitive screen, and the like. In one aspect, user input may also include voice activation or voice control utilizing voice recognition software.

The housing 306 may house the coil 308 and it may partially house the punching cylinder 302. The housing 306 may further include a noise reducing material 206 consistent with the remaining disclosure.

Figure 18:
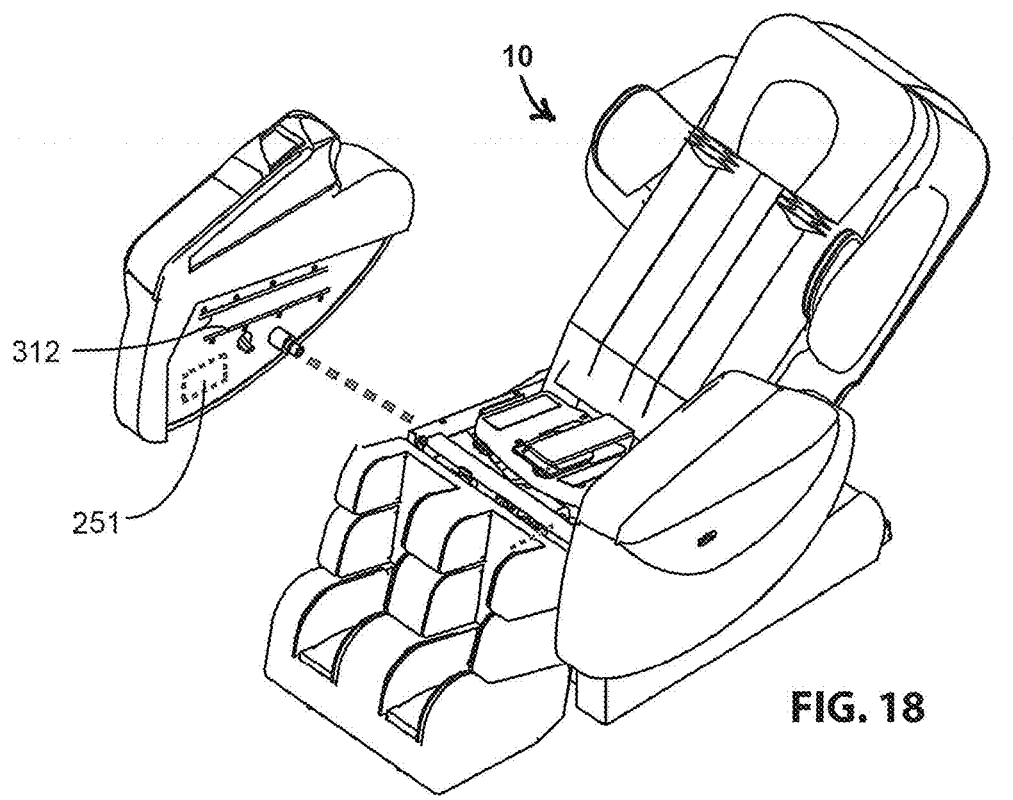
FIG. 18 is an exploded view of the chair with armrest removed according to the disclosure.
Figure 19:
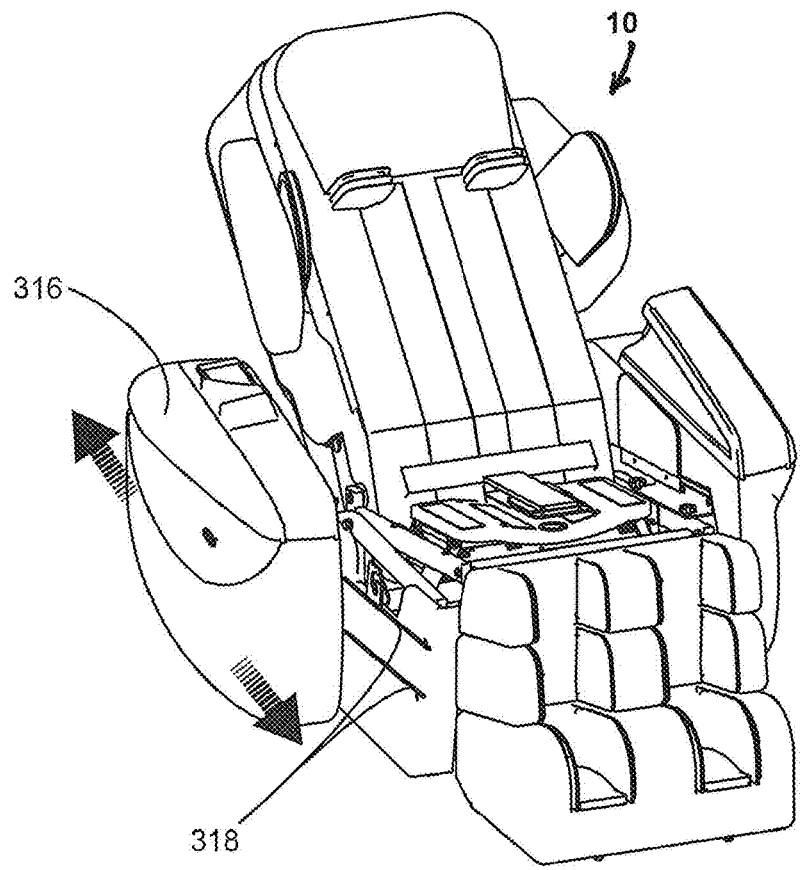
FIG. 19 illustrates an armrest sliding feature according to another aspect of the disclosure.

FIG. 18 is an exploded view of the chair with armrest removed according to the disclosure; and FIG. 19 illustrates an armrest sliding feature according to another aspect of the disclosure.

In particular, FIG. 18 and FIG. 19 illustrate a slide rack/first sliding device that may allow the armrest 316 to slide forward or backward wherein the sliding rack may be mounted to a side of a base stand of the massage chair 10. Additionally, the slide rack may include at least a locking mechanism to lock the armrest 316 at one position (not shown).

In particular, an armrest 316 may include a second section 251, a slide rack/first sliding device 312, and a corresponding slide rack/second sliding device 318. In one aspect, the slide rack/first sliding device 312 comprises two separated parallel guide rails and the corresponding slide rack/second sliding device 318, which also comprises two separated parallel guide rails, may cooperate to mechanically fasten the armrest 316 to the massage chair 10. Additionally, the slide rack/first sliding device 312 and the corresponding slide rack/second sliding device 318 may cooperate to mechanically allow the armrest 316 to move toward the front of the massage chair 10 as well as move toward the rear of the massage chair 10. In this regard, the armrest 316 may be positioned at any desired location consistent with the desires of the user. Moreover, the armrest 316 may be removed for shipping as well as delivery.

Figure 20:
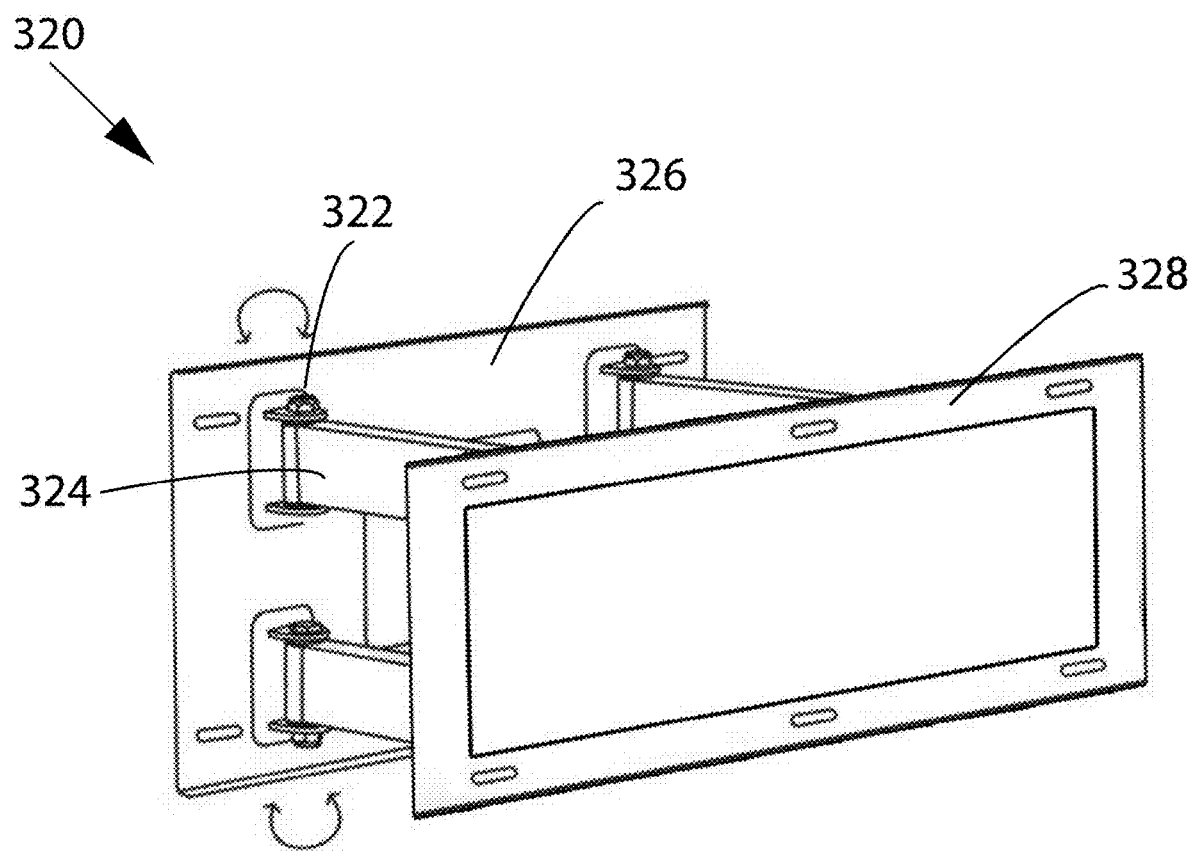
FIG. 20 is a perspective view of a sliding wing, another mounting option for armrest sliding feature according to another aspect of the disclosure.

FIG. 20 is a perspective view of a sliding wing, another mounting option for armrest sliding feature according to another aspect of the disclosure.

In particular, FIG. 20 illustrates a support structure/sliding wing 320 for supporting an armrest 316. The support structure/sliding wing 320 may have a plurality of arms 324 that are pivotally connected to a base structure 326. In particular, the arms 324 may pivot as indicated by the arrows on a pivot joint 322 connected to the base structure 326. This allows an armrest connection portion 328 of the support structure/sliding wing 320 to be moved to any desired position. In one aspect, the support structure/sliding wing 320 may support the armrest 316 on the armrest connection portion 328. In particular, the base structure 326 may be connected to a side of the massage chair 10 and the armrest 316 may be connected to the armrest connection portion 328. With this configuration, the armrest 316 being connected to the armrest connection portion 328 may pivot and translate in a forward and backwards motion to be placed in an infinite number of positions as desired by the user of the massage chair 10.

Figure 21:
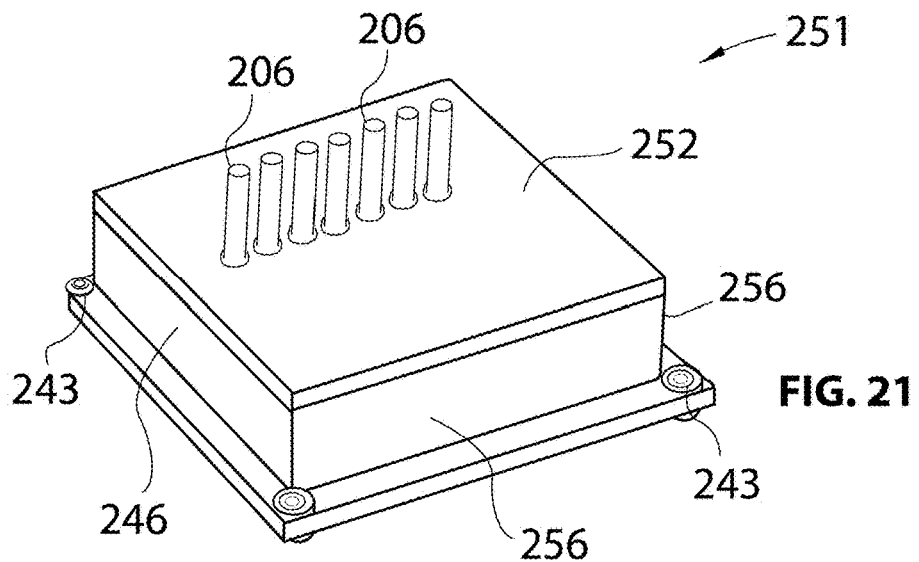
FIG. 21 illustrates a perspective view of an enclosure section for air valves according to the disclosure.
Figure 22:
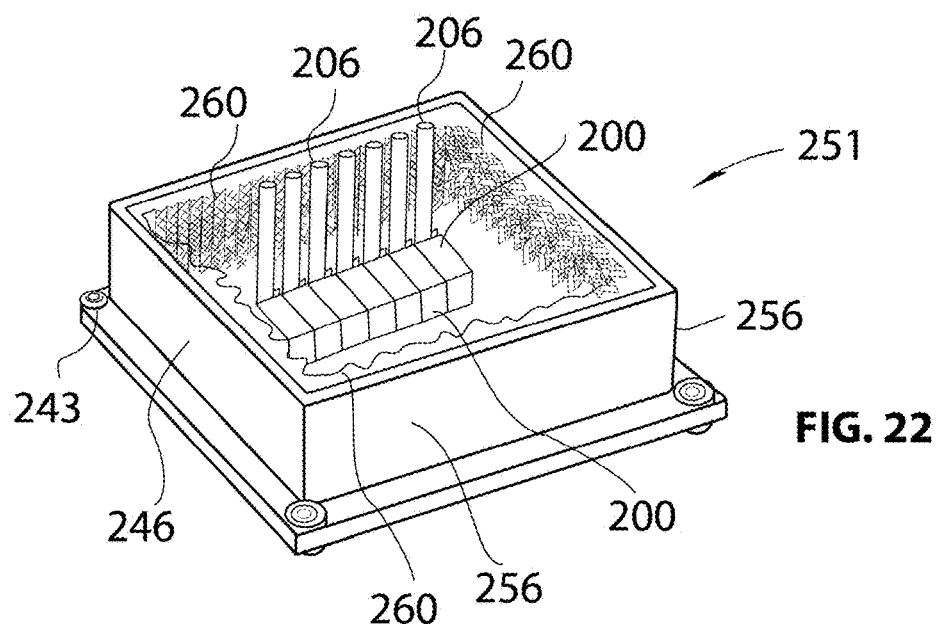
FIG. 22 illustrates a perspective view of the enclosure section for air valves according to FIG. 21 with a top cover removed.

FIG. 21 illustrates a perspective view of an enclosure section for air valves according to the disclosure; FIG. 22 illustrates a perspective view of the enclosure section for air valves according to FIG. 21 with a top cover removed; and FIG. 23 illustrates a perspective view of the enclosure section for air valves according to FIG. 21 with a top cover in front cover removed.

Figure 23:
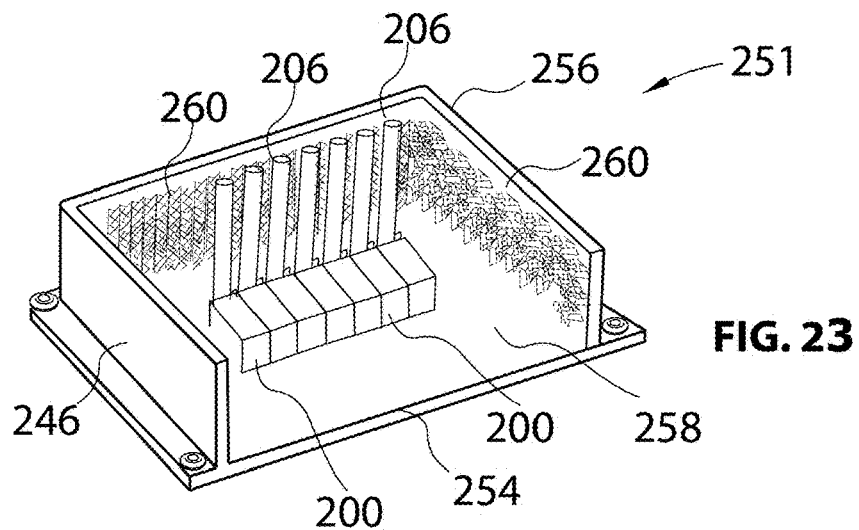
FIG. 23 illustrates a perspective view of the enclosure section for air valves according to FIG. 21 with a top cover in front cover removed.

In particular, FIG. 21, FIG. 22, and FIG. 23, illustrate the second section 251 of an enclosure housing that encloses (partially, substantially, or fully encloses) the plurality of air valve devices 200 such that noise generated from or made by the plurality of air valve devices 200 during operation is reduced, contained, or eliminated. The second section 251 may also have a plurality of foot elements 243 positioned at predetermined locations on the periphery of the second section 251. Additionally, the second section 251 may be configured to allow the air valve outlets 206 to extend from the second section 251 for connection to the plurality of air massage elements 180.

The second section 251 may include a top 252, a plurality of sides 246, a plurality of sides 256, an inner surface 258, and an outer surface. Preferably, the inner surfaces 258 and noise-reducing (or noise-absorbing, noise-containing, or noise-cancelling) material 260 form noise-reducing (or noise-absorbing, noise-containing, or noise-cancelling) walls for the second section 251. The second section 251 encloses (partially, substantially, or fully encloses) the plurality of air valve devices 200.

Figure 24:
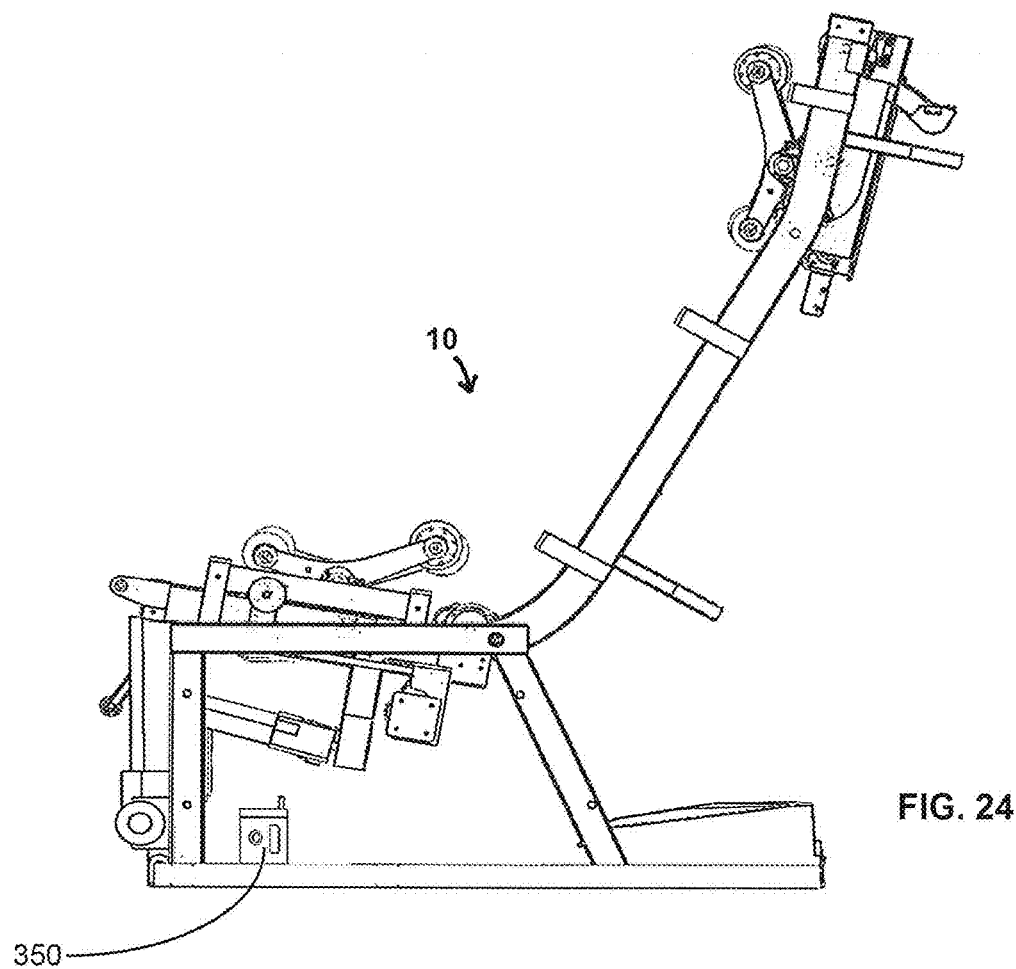
FIG. 24 illustrates a side view of the massage chair frame with an oxygen generator according to the disclosure.
Figure 25:
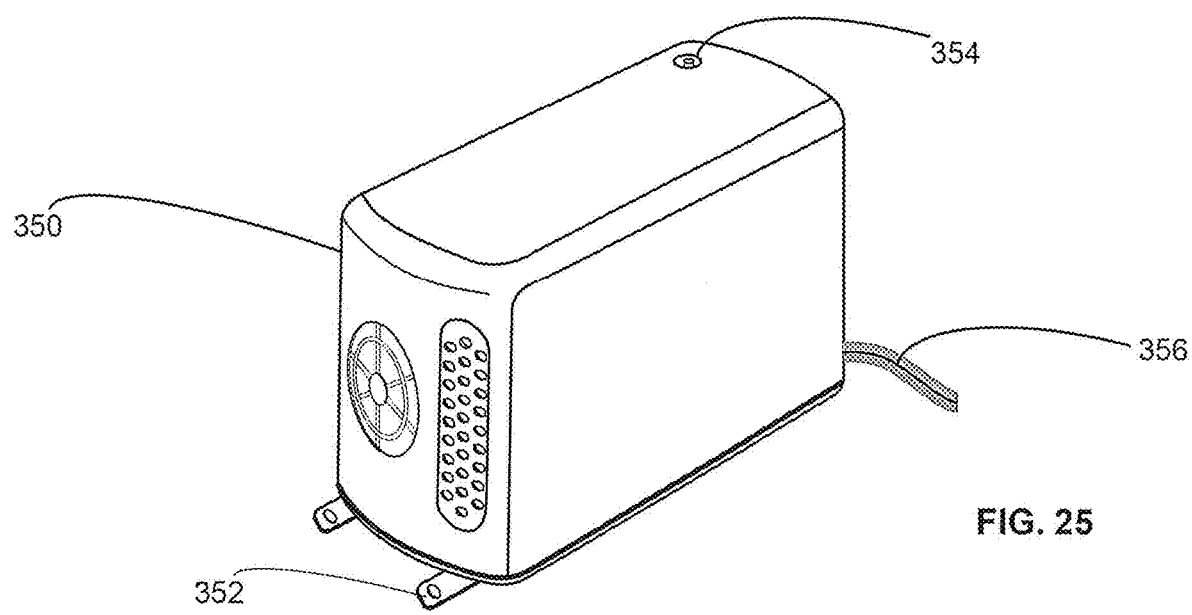
FIG. 25 illustrates an oxygen generator according to the disclosure.

FIG. 24 illustrates a side view of the massage chair frame with oxygen generator according to the disclosure; and FIG. 25 illustrates an oxygen generator according to the disclosure.

In particular, FIG. 24 and FIG. 25 illustrate an Oxygen Concentrator Generator to provide Oxygen Therapy to the user. Generation of oxygen for a user may have a number of pleasant or beneficial effects for a user. Moreover, the user may medically need a higher percentage of oxygen in their environment for medical reasons.

FIG. 24 illustrates an exemplary positioning and arrangement of an oxygen generator 350 within the massage chair 10. In one aspect, the oxygen generator 350 may be configured as an oxygen concentrator that may concentrate oxygen from a gas supply (typically ambient air) by selectively removing nitrogen to supply an oxygen-enriched gas stream. In one aspect, the oxygen generator 350 may operate utilizing pressure swing adsorption (PSA) technology. FIG. 25 illustrates further details of the oxygen generator 350. The oxygen generator 350 may include an oxygen outlet 354, a power supply 356, mounting structures 352, and the like.

Figure 26:
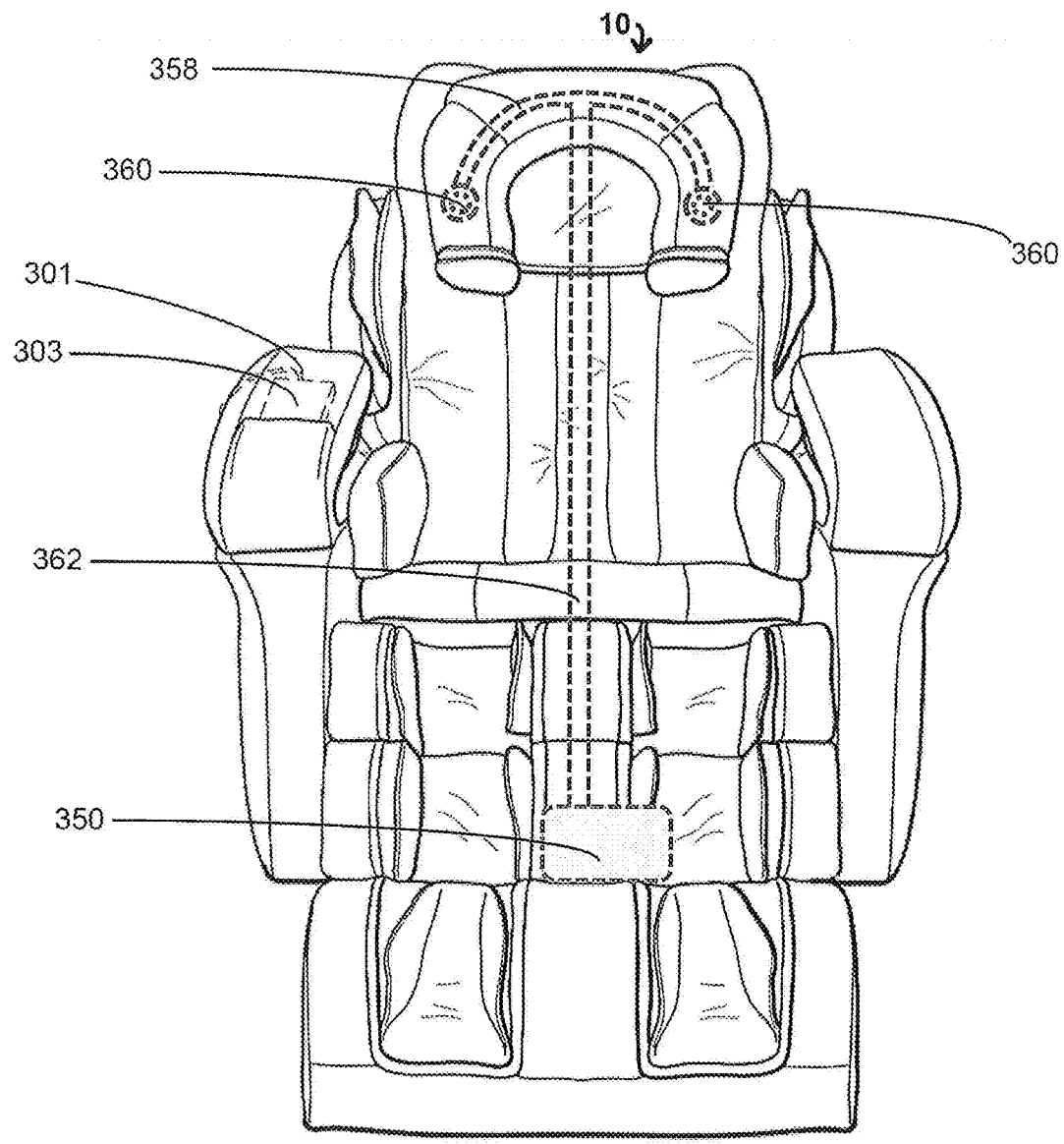
FIG. 26 illustrates a massage chair having an oxygen distribution system according to the disclosure.

FIG. 26 illustrates a massage chair having an oxygen distribution system according to the disclosure.

In particular, FIG. 26 illustrates an oxygen distribution system that may include the oxygen generator 350 located within the massage chair 10 as illustrated in FIG. 25. Moreover, the oxygen distribution system may include an oxygen tube 362 that may be connected to the oxygen generator 350 that may extend toward the top of the massage chair 10. Additionally, the oxygen distribution system may include an oxygen tube 358 that may connect to the oxygen tube 362. In one aspect, there may be a manifold connecting the oxygen tube 358 to the oxygen tube 362. In one aspect, one or more oxygen vents 360 may be positioned at the end of the oxygen tube 358. The oxygen vents 360 may be located near a headrest portion of the massage chair 10. In operation, the oxygen generator 350 creates an oxygen rich supply of air that is output from the oxygen outlet 354. The oxygen outlet 354 may be connected to the oxygen tube 362 delivering the oxygen rich supply of air to the oxygen tube 358 and subsequently to the oxygen vents 360 for delivery to the environment of the user near the headrest of the massage chair 10.

Figure 27:
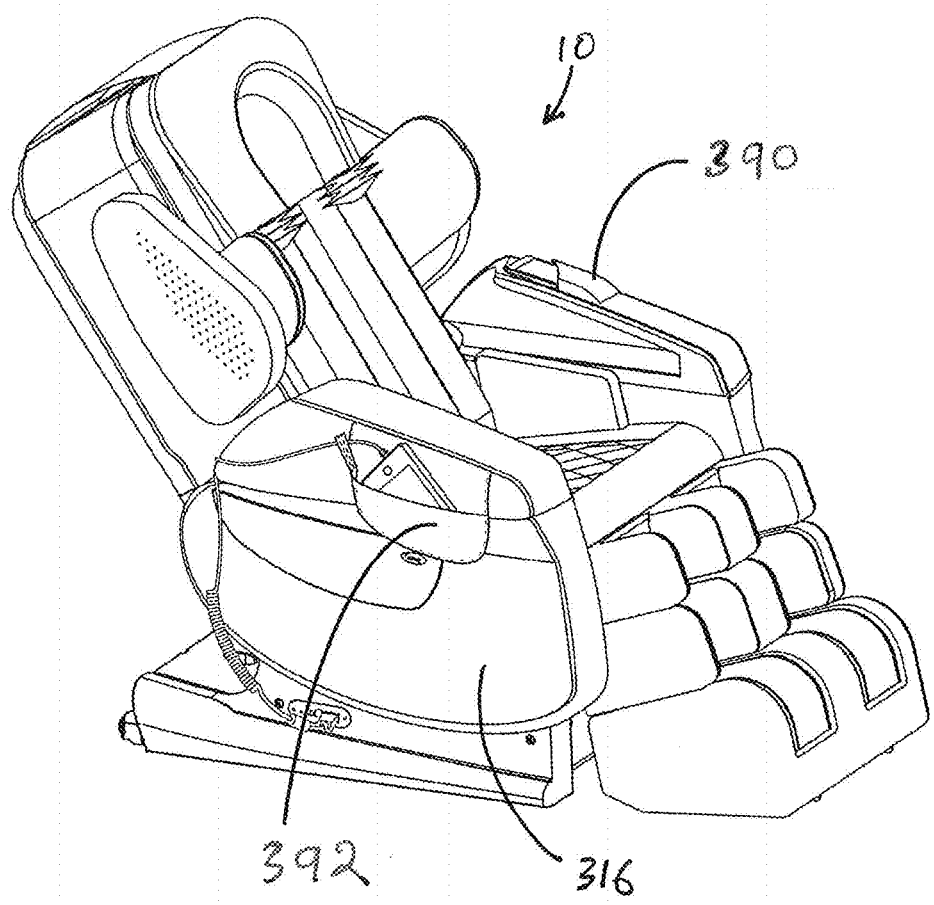
FIG. 27 illustrates a massage chair having a wireless device pouch and a remote control pouch according to the disclosure.

FIG. 27 illustrates a massage chair having a wireless device pouch and/or a remote control pouch according to the disclosure.

In particular, FIG. 27 illustrates that the massage chair 10 may include a wireless device pouch 390 and/or a remote control pouch 392. In one aspect, the remote control pouch 392 may be sized to receive a remote control for an audiovisual device such as a television, media player, DVR, cable box, stereo, and the like. The remote control pouch 392 may be formed of fabric that is the same or consistent with the massage chair 10 in order to have a pleasing and integrated appearance. In one aspect, the remote control pouch 392 may be formed of multiple connected fabric portions creating a pocket to insert the remote control into the remote control pouch 392. Other constructions are contemplated as well. In one aspect, the remote control pouch 392 may be connected to the armrest 316 in order to be easily accessed by the user of the massage chair 10.

Additionally or alternatively, the massage chair 10 may include a wireless device pouch 390 that may be sized to receive a wireless device such as a phone, smartphone, tablet computer, and the like. The wireless device pouch 390 may be formed of fabric that is the same or consistent with the massage chair 10 in order to have a pleasing and integrated appearance. In one aspect, the wireless device pouch 390 may be formed of multiple connected fabric portions creating a pocket to insert the wireless device into the wireless device pouch 390. Other constructions are contemplated as well. In one aspect, the wireless device pouch 390 may be connected to the armrest 316 in order to be easily accessed by the user of the massage chair 10. In a further aspect, the wireless device pouch 390 may include a wireless charger 303 as described in relation to FIG. 28.

Figure 28:
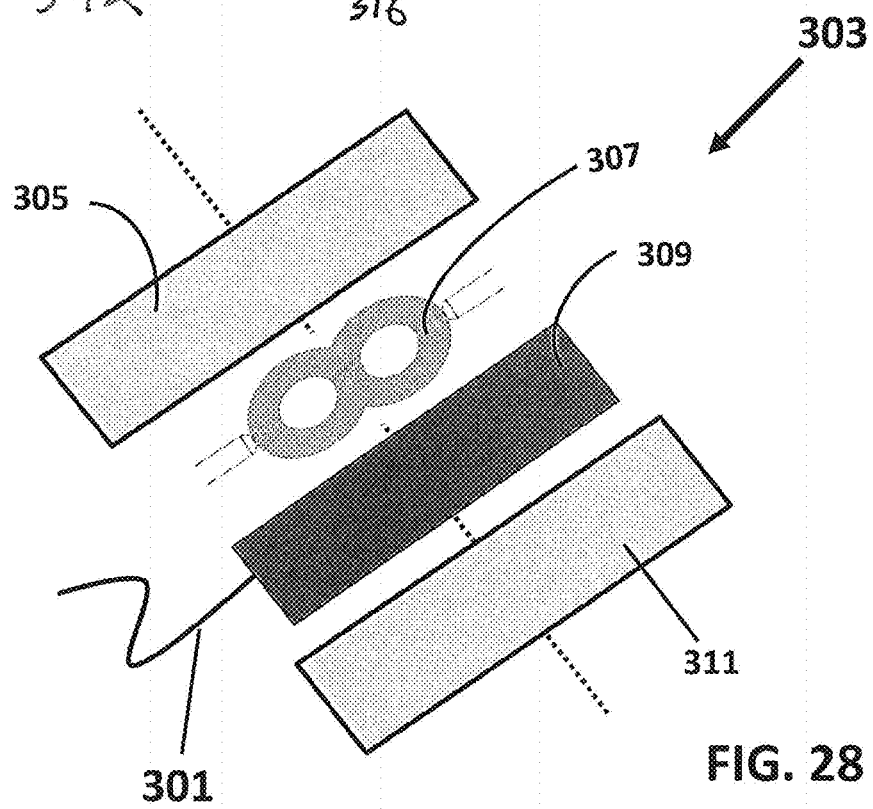
FIG. 28 illustrates a wireless charger configured to be implemented in the massage chair according to the disclosure.

FIG. 28 illustrates a wireless charger configured to be implemented in the massage chair according to the disclosure.

In particular, the massage chair 10 may include a fast wireless charger 303 configured for charging a wireless device such as a phone, smartphone, tablet computer, and the like. In one aspect, the fast wireless charger 303 may be integrated with the wireless device pouch 390. The fast wireless charger 303 may be configured as a charging pad for the wireless device. The fast wireless charger 303 may include a power connector 301 for providing power to the fast wireless charger 303.

In one aspect, the fast wireless charger 303 may be integrated into the massage chair 10. In one aspect, the fast wireless charger 303 may be located adjacent, under, or integrated into the wireless device pouch 390. In one aspect, the fast wireless charger 303 may provide wireless power to charge a phone or similar portable devices. The fast wireless charger 303 may include a top cover 305, a coil 307, an electronic charging control printed circuit board (PCB) 309, a cable 301 to receive power, a bottom cover 311. Power for the fast wireless charger 303 may be supplied by the massage chair 10. In this regard, fast wireless charger 303 may transfer energy from the fast wireless charger 303 to a receiver in the back of the wireless device via electromagnetic induction. The fast wireless charger 303 may use the coil 307 implemented as an induction coil to create an alternating electromagnetic field, which a receiver coil in the wireless device converts back into electricity to be fed into the battery of the wireless device.

The fast wireless charger 303 may be configured to Intelligently Identify Charging Devices and the fast wireless charger 303 may be configured to vary the power is applied to the wireless device from 5 W to 10 W mode using QC2.0/QC3.0 adapter. In one aspect, the fast wireless charger 303 may be configured to be very light and thin, and the fast wireless charger 303 may be configured to provide good heat dissipation. Additionally, the massage chair 10 may also be configured with the fast wireless charger 303 to provide good heat dissipation In one aspect, the fast wireless charger 303 may be case friendly. In this regard, the fast wireless charger 303 may be configured charge straight through even extra-tough cases. Of course, such implementations may affect the charging speed a little and metal attachments or credit cards may interfere with charging.

In further aspects, the fast wireless charger 303 may be configured with High-efficiency Charging & Multiple Protection. In one aspect, the fast wireless charger 303 may be configured with a charging speed that is up to 20% faster than prior art wireless chargers. In further aspects, the fast wireless charger 303 may be configured with temperature protection, input voltage protection, input current protection, short circuit protection, and other multiple safety protection, to ensure the safety of the wireless device and the massage chair 10 during the entire charging process.

In further aspects, the fast wireless charger 303 may include a soft breathing light. In this regard, the fast wireless charger 303 may implement the soft breathing light after entering the charging mode and the soft breathing light will slowly pulse indicating charging of the wireless device by the fast wireless charger 303.

The disclosure has disclosed a massage chair having a massage chair frame, a massage system that includes a plurality of air massage elements, and a noise-reducing (or noise-absorbing, noise-containing or noise-cancelling) enclosure device. Additionally, the disclosure has disclosed additional features for improving user experience including hammering devices, heating acupuncture devices, oxygen generation, voice recognition control of the massage chair, a remote control pouch, and a wireless device pouch having wireless charging functionality. All of these features provide an improved experience for the user using the massage chair 10.

The controller as described in the disclosure may include a processor, a microprocessor, a random-access memory, a read-only memory, input devices, output devices, and the like. The microprocessor may implement software for operating the various features of the massage chair 10. In one aspect a microprocessor may implement voice recognition software. The input devices may include switches, buttons, a touch sensitive screen, microphones, and the like for operating the various features of the massage chair 10.

Voice recognition software may be utilized in various aspects of the systems and methods. Users may be able to vocalize, rather than utilizing other input processes. For example, the voice recognition software may be configured for generating text from voice input from a microphone or other voice input. A speech signal processor may convert speech signals into digital data that can be processed by the processor. The processor may perform several distinct functions, including serving as the speech event analyzer, the dictation event subsystem, the text event subsystem, and the executor of the application program. The speech signal processor may generate speech event data and transmit this data to the processor to be processed first by the speech event analyzer. The speech event analyzer may generate a list or set of possible candidates among the system recordings that represent or match the voice input processed by the speech signal processor. The speech event analyzer may transmit the candidate sets to a dictation event subsystem.

The dictation event subsystem may analyze the candidate sets and choose the best match candidate with the highest degree of similarity. This candidate is then considered the correct translation, and the dictation event subsystem forwards the translation to the text event subsystem which in turn inputs the translated text into the device.

It is to be understood that the disclosure is not limited to the embodiments described above or as shown in the attached figures, but encompasses any and all embodiments within the spirit of the invention.

What is claimed is:

1. A massage chair comprising:
A wireless charger;
a footrest portion;
a seat body area portion;
a backrest portion;
a massage system in operational communication with said backrest portion and configured to provide massaging effects to a user when positioned in a said massage chair; and
a noise reducing enclosure device comprising an enclosure housing,
wherein said enclosure housing comprises a first section and a second section disposed side by side to each other,
wherein said first section encloses at least one compressor or pump while said second section encloses at least one air valve device,
wherein said first section comprises a noise reducing material surrounding said at least one compressor or pump, and
wherein said second section comprises a noise-reducing material surrounding said at least one air valve device.

2. The massage chair according to claim 1, further comprising a wireless device pouch.

3. The massage chair according to claim 2, wherein said wireless device pouch comprises said wireless charger.

4. The massage chair according to claim 1, further comprising at least one sliding device that allows an armrest to slide forward or backward.

5. The massage chair according to claim 1, wherein said wireless charger is located on an armrest of said massage chair.

6. The massage chair according to claim 1, further comprising at least one hammer punching device that is configured to provide a punching massage effect to the user when positioned in said massage chair.

7. The massage chair according to claim 6, wherein said at least one hammer punching device is positioned in said footrest portion.

8. The massage chair according to claim 1, further comprising an oxygen generator.

9. The massage chair according to claim 1, further comprising a controller that comprises a processor, a microprocessor, and a touch screen, wherein said processor implements software for operating said massage system, and wherein said microprocessor processes touch inputs from a user and operationally communicates with said massage system.

10. A massage chair comprising:
at least one oxygen vent that is built-in said massage chair;
a footrest portion;
a seat body portion;
a backrest portion; and
a noise-reducing enclosure device comprising an enclosure housing,
wherein said enclosure device comprises a first section and a second section disposed side by side to each other,
wherein said first section encloses at least one compressor or pump while said second section encloses at least one air valve device,
wherein said first section comprises a noise reducing material surrounding said at least one compressor or pump, and
wherein said second section comprises a noise-reducing material surrounding said at least one air valve device.

11. The massage chair according to claim 10, wherein said at least one oxygen vent is a plurality of oxygen vents.

12. The massage chair according to claim 10, further comprising a headrest.

13. The massage chair according to claim 12, wherein said headrest comprises said at least one oxygen vent.

14. The massage chair according to claim 10, wherein said massage system comprises at least one air cell, said at least one compressor or pump, and said at least one air valve device for regulating air flow into and out of said at least one air cell.

15. The massage chair according to claim 10, further comprising an oxygen generator.

16. The massage chair according to claim 15, wherein all of inner surfaces of said first section and said second section of said enclosure housing are covered by noise-reducing material such that said at least one compressor or pump and said at least one air valve device are fully surrounded by said noise-reducing material.

17. A massage chair comprising:
a footrest portion;
a seat body area portion;
a backrest portion;
a massage system in operational communication with said backrest portion and configured to provide massaging effects to a user when positioned in said massage chair; and
at least one sliding wing engaged to a side of a base stand and also to a side of an armrest facing toward said seat body area portion,
wherein said at least one sliding wing comprises a base structure, an armrest connection portion, and at least two separated pivot arms for connecting to said base structure and said armrest connection portion to transfer said armrest in a forward motion and, alternatively, in a backward motion, independent of motion of said backrest portion, and
wherein said base structure and said armrest connection portion are disposed opposite to each other.

18. The massage chair according to claim 17, further comprising at least one hammer punching device.

19. The massage chair according to claim 18, further comprising an armrest portion, and wherein said at least one hammer punching device is positioned in said armrest portion.

20. The massage chair according to claim 18, wherein said at least one hammer punching device is positioned in said footrest portion.

21. The massage chair according to claim 17, wherein said at least one sliding wing further comprises a pivot joint to allow said at least one sliding wing to transfer said armrest in a forward motion and, alternatively, in a backward motion.

22. The massage chair according to claim 17, further comprising a wireless charger.

23. The massage chair according to claim 17, wherein said massage system comprises at least one air cell, at least one compressor or pump, and at least one air valve device for regulating air flow into and out of said at least one air cell.

24. The massage chair according to claim 17, further comprising a noise-reducing enclosure device that comprises an enclosure housing, wherein said enclosure housing comprises a first section and a second section, wherein said first section encloses at least one compressor or pump while said second section encloses at least one air valve device, wherein said first section comprises a noise-reducing material surrounding said at least one compressor or pump, and wherein said second section comprises a noise-reducing material surrounding said at least one air valve device.

25. The massage chair according to claim 24, wherein all of inner surfaces of said first section and said second section of said enclosure housing are covered by noise-reducing material such that said at least one compressor or pump and said at least one air valve device are fully surrounded by said noise-reducing material.

26. A massage chair comprising:
a footrest portion;
a seat body area portion;
a backrest portion;
a massage system in operational communication with said backrest portion and configured to provide massaging effects to a user when positioned in said massage chair;
a first sliding device mounted to a side of a base stand; and
a second sliding device mounted to a side of an armrest facing toward said seat body area portion, and
wherein each of said first sliding device and said second sliding device comprises two separated, parallel slide guide rails, and
wherein said first sliding device and said second sliding device are corresponded to one another to allow said armrest to be moved in a forward motion and, alternatively, in a backward motion, independent of motion of said backrest portion.

27. The massage chair according to claim 26, further comprising at least one hammer punching device.

28. The massage chair according to claim 26, further comprising a microphone and a voice recognition software configured to receive voice commands from said microphone.

29. The massage chair according to claim 26, further comprising a controller comprising a processor, a microprocessor, and a touch screen, wherein said processor implements software for operating said massage system, and wherein said microprocessor processes touch inputs from a user and operationally communicates with said massage system.

30. The massage chair according to claim 26, further comprising a wireless charger.

31. The massage chair according to claim 30, wherein said wireless charger is located on said armrest of said massage chair.

32. The massage chair according to claim 26, further comprising an oxygen generator or concentrator, wherein said oxygen generator or concentrator is activated when the user selects an option on said touch screen.

33. The massage chair according to claim 26, wherein said massage system comprises at least one air cell, at least one compressor or pump, and at least one air valve device for regulating air flow into and out of said at least one air cell.

34. The massage chair according to claim 26, further comprising a noise-reducing enclosure device that comprises an enclosure housing, wherein said enclosure housing comprises a first section and a second section, wherein said first section encloses at least one compressor or pump while said second section encloses at least one air valve device, wherein said first section comprises a noise-reducing material surrounding said at least one compressor or pump, and wherein said second section comprises a noise-reducing material surrounding said at least one air valve device.

35. The massage chair according to claim 34, wherein all of inner surfaces of said first section and said second section of said enclosure housing are covered by noise-reducing material such that said at least one compressor or pump and said at least one air valve device are fully surrounded by said noise-reducing material.

* * * * *